United States Patent [19]

Woodley et al.

[11] Patent Number: 4,974,785

[45] Date of Patent: Dec. 4, 1990

[54] SPLICING HEAD ASSEMBLY FOR TAPE LOADING MACHINES

[75] Inventors: George M. Woodley, Shrewsbury; Richard A. McGrail, Worcester; Stephen J. Powers, Webster; William W. Ross, Framingham, all of Mass.

[73] Assignee: King Instrument Corporation

[21] Appl. No.: 157,322

[22] Filed: Feb. 17, 1988

[51] Int. Cl.⁵ .................. B31F 5/00; G03D 15/04; B65H 35/04
[52] U.S. Cl. ................. 242/56 R; 156/505
[58] Field of Search ............ 242/56 R; 156/505, 506

[56] References Cited

U.S. PATENT DOCUMENTS

| | | | |
|---|---|---|---|
| 4,417,942 | 11/1983 | Kincheloe | 156/505 X |
| 4,501,630 | 2/1985 | Kiuchi | 156/505 X |
| 4,629,138 | 12/1986 | Kubo | 242/56 R |
| 4,682,742 | 7/1987 | Woodley | 156/506 X |
| 4,722,488 | 2/1988 | Kubo | 242/56 R |

*Primary Examiner*—Stuart S. Levy
*Assistant Examiner*—Joseph Rhoa

[57] ABSTRACT

A new and improved splicing block assembly and a novel splicing tape dispenser applicator for a cassette-loading machine are disclosed. The improved splicing block assembly comprises a first splicing block having a first tape guide means located in a selected plane, a second splicing block having a second tape guide means located in said selected plane in alignment with said first tape guide means, means mounting said second block for reciprocal movement along a selected axis extending parallel to said first and second tape guide means between a first position in which said second block is adjacent to said first block and a second position in which said second block is spaced from said first block, a third splicing block having a third tape guide means that extends parallel to said selected axis, and means mounting said third splicing block for reciprocal movement between (1) a first position in which said third splicing block is spaced from said first and second splicing blocks and (2) a second position in which said third splicing block is located between said first and second splicing blocks and said third tape guide means is located in said selected plane in alignment with at least one of said first and second tape guide means. The new dispenser-applicator is a transfer type device comprising dispensing means for dispensing and cutting a splicing tape into pieces of preselected lengths, and applicator means for transferring the cut pieces of splicing tape to a splicing block assembly that is a substantial distance from the dispensing means.

35 Claims, 17 Drawing Sheets

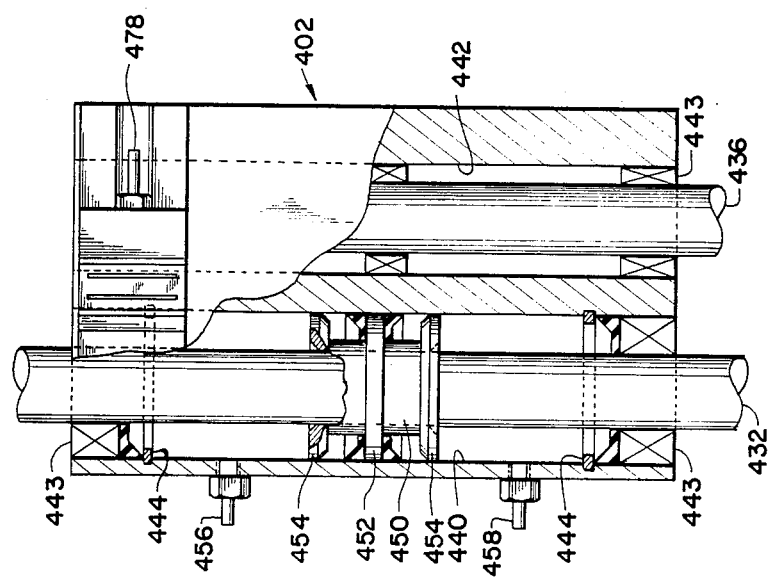
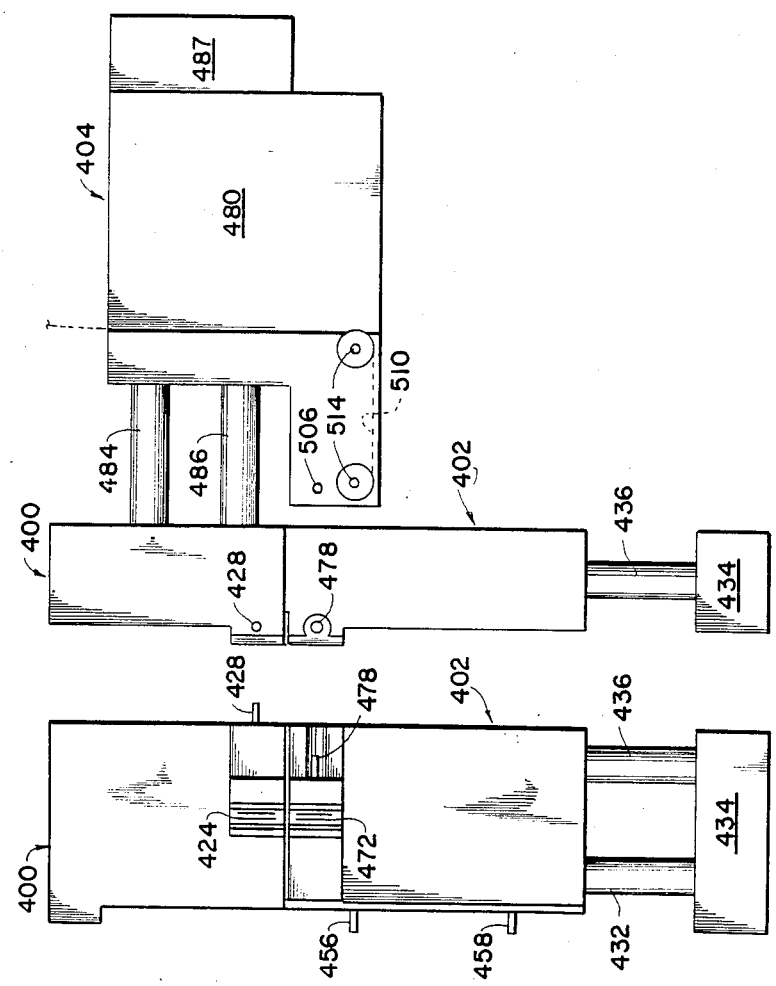

SPLICING HEAD ASSEMBLY FOR TAPE LOADING MACHINES

This invention relates to tape loading machines and more particularly to an improved splicing block assembly for use in splicing tape in a tape winding machine.

BACKGROUND OF THE INVENTION

A variety of machines are known for loading a use tape, e.g., a magnetic recording tape, onto hubs or into cassettes. Such machines are commonly known as "cassette loaders", "tape loaders", "tape winders" or "tape winding and splicing machines". They employ various types of splicing block assemblies for use in supporting tape which is to be spliced. The term "splicing block assembly" is sometimes called a "splicing block head" or a "shift block assembly". Examples of machines showing different splicing block assemblies are illustrated by U.S. Pat. Nos. 3637153, 3737358, 3825461, 3997123, 4061286, 4062719, 4512904, 4486262 and 4682742. The above-identified patents illustrate machines for loading magnetic tape into Philips-type audio cassettes and video cassettes, e.g., VHS, Beta and 8 mm cassettes. The audio cassettes and the video tape cassettes are similar in that the loaded cassettes consist of a cassette case containing two rotatable spools or hubs, a leader tape attached to each spool or hub, and a predetermined length of magnetic recording tape having its ends spliced to the two leaders. VHS and Beta-type video cassettes are substantially larger than Philips-type audio cassettes and differ therefrom in that they have (1) a pivoted door which conceals the recording tape when the cassette is not in use, (2) means for releasably locking the door, and (3) means for releasably locking the hubs against rotation. The 8 mm type video cassettes are close in size to the Philips-type cassettes, but they also have a pivoted door which conceals the tape when the cassette is not in use, and means for releasably locking the door. Another more recent form of cassette is the so-called RDAT cassette, which is smaller in size than the 8 mm video cassette and is used primarily for digital audio recording on magnetic tape. The RDAT cassettes have a door which is opened when the cassette is to be used.

The manufacture of loaded audio or video cassettes is similar in that the common practice is to start with a C-Zero ("C-0") cassette, i.e., a cassette that consists of a cassette case with the two hubs and a length of leader tape having one end connected to one hub and the other end connected to the second hub. These C-Zero cassettes are then filled with blank or prerecorded tape by means of automatic loading machines of the type known as in-cassette tape loaders. In some quarters the term "V-Zero" ("V-0") is used to identify an empty video cassette. However, more commonly the term "C-Zero" applies to both audio and video cassettes.

The procedure for loading magnetic tape into "C-0" audio and video cassettes comprises the following steps: (1) withdrawing a selected length of leader tape from the C-Zero cassette; (2) cutting the leader tape in two so as to form first and second leaders; (3) splicing the leading end of the magnetic tape to be wound into the cassette to the first leader; (4) rotating the hub to which the first leader is connected so as to wind a given length of magnetic tape onto that hub; (5) terminating winding of magnetic tape onto the first hub; (6) cutting the wound magnetic tape at a selected point outside of the cassette; (7) splicing the trailing end of the given length of magnetic tape to the second leader attached to the other hub; (8) winding the trailing end of the given length of magnetic tape and the second leader into the cassette; and (9) ejecting the loaded cassette from the cassette loader and replacing it with a new C-Zero cassette.

In the most common tape loaders, a splicing block assembly is required for the purpose of supporting and guiding the leading end of the tape to be wound and also the withdrawn leader from the cassette, so as to permit the leader and the magnetic tape to be cut at appropriate points in the cycle of operation and also to permit the leading and trailing ends of the magnetic tape to be spliced to the two leaders that are formed when the withdrawn leader is cut in two. The most common forms of splicing block assemblies comprise two or three splicing blocks. In the case of a splicing block assembly having two splicing blocks, one of the splicing blocks is movable and the other is stationary, and the movable splicing block has two parallel grooves for holding one of the two leaders and the magnetic tape to be wound and the stationary splicing block has another groove for holding the second leader. In the case where the splicing block assembly comprises three blocks, one block is usually stationary and the other two blocks are movable, and each of the blocks has its own track for supporting a leader tape or a magnetic tape to be wound into a cassette. Such forms of splicing head assemblies are illustrated by the patents mentioned hereinabove.

Audio cassettes are the easiest to load because the C-Zero audio cassettes have a relatively long leader. As a consequence, the space and position requirements of the splicing block assembly in an audio tape loader are less stringent than is the case with video cassettes. The VHS and Beta-type video cassettes have a relatively short leader, with the result that the splicing block head must be able to accommodate the shorter leader. The advent of the 8 mm video cassette was significant in that its leader was much shorter than the leader in the larger size VHS or Beta video cassettes. The leader of an 8 mm video cassette is only about 150 mm long from hub to hub. As a consequence, the splicing block assembly for an 8 mm video cassette loader machine must be able to accommodate a much shorter leader than is the case with machines for loading the larger size VHS or Beta video cassettes.

The advent of the RDAT cassette presents even more severe problems. The industry-recommended standard specifications for RDAT cassettes calls for a leader having a length of approximately 60 mm±5 mm. This relatively short leader tape complicates the loading of RDAT cassettes. While some loading machine customers may accept RDAT leaders that are longer than the industry standard, machines are still required to load RDAT cassettes according to the industry standard specifications. The short length of available leader tape makes it impossible or difficult to load magnetic tape into RDAT cassettes using splicing head assemblies patterned after those heretofore used to load audio cassettes or VHS or Beta or 8 mm format video cassettes, so as to conform to the industry-accepted standard specifications and also to the requirements of individual manufacturers regarding quality, speed and reliability.

BRIEF SUMMARY OF THE INVENTION

A primary object of this invention is to provide a new and improved machine capable of being adapted to load different types of C-Zero cassettes, in particular cassettes with leaders of different lengths and widths, e.g., RDAT cassettes, 8 mm video cassettes, VHS and Betamax video cassettes, and audio cassettes.

Another primary object of this invention is to provide a new and improved shift block assembly that is compact and reliable and is especially advantageous for loading C-Zero cassettes having a relatively short leader.

A further primary object is to provide a new and improved transfer-type splicer.

A further object is to provide a new and improved cassette loading machine that is compact and satisfies industry requirements as to reliability, loading speed and quality of tape pack wound into a cassette.

Another object of this invention is to provide an improved splicing block assembly that facilitates the loading of magnetic tape into C-Zero RDAT cassettes having leaders with a length conforming to industry-accepted standards (i.e., leaders with a length of approximately 60 mm) in a manner that satisfies industry requirements as to quality and speed.

A further object of the invention is to provide a new and improved splicing block assembly that occupies a relatively small amount of space and requires only a moderate number of operating mechanisms, whereby the shift block assembly tends to be quick-acting and more reliable than prior shift block assemblies.

Still a further object of the invention is to provide an improved form of shift block assembly of the type that comprises three individual tape supporting members, i.e., three individual splicing blocks, one each for holding one of the two leaders and the third for holding the tape which is to be wound into the cassette, with the splicing blocks being disposed for relative reciprocal movement along predetermined axes.

A further object is to provide a new splicer mechanism that is associated with cutting means for severing the leader for a C-0 cassette and the use tape at different points in a cassette loading cycle, and utilizes a rotatable arm for applying a piece of splicing tape to two tapes to be spliced.

These and other objects of the invention are achieved by providing a splicing block head, i.e., a splicing or shift block assembly, that essentially comprises first, second and third splicing blocks, with the second and third splicing blocks being mounted for reciprocal movement on first and second orthogonally-disposed axes, respectively. Each of the splicing blocks has a guideway for supporting and aligning a tape to be spliced, plus apertures for applying suction so as to hold a tape in position in the guideway. Two of the blocks are disposed in tandem along the first axis, with one of the two blocks being fixed and the other one being movable toward and away from the first block. The third block is disposed for reciprocal movement along the second axis. The first and second splicing blocks are used to hold the leaders of a C-0 cassette, and the third block is used to hold the use tape, i.e., the magnetic or other recording tape, that is to be loaded. Separate actuating means are provided for reciprocating the second and third blocks.

The splicing block assembly forms part of a machine that includes a cutter mechanism and a splicer. The cutter mechanism includes a knife and actuating means for causing the knife to move back and forth between (a) the first and second splicing blocks when the latter are adjacent one another or (b) between the first and third splicing blocks when the latter are adjacent one another, whereby the knife edge will sever a leader that extends between the first and second splicing blocks or a use tape that extends between the first and third splicing blocks. The splicing blocks are manipulated so as to allow the leader tape of a C-Zero cassette to be severed by the knife mechanism into first and second leaders and spliced to the leading and trailing ends respectively of a predetermined length of tape that is loaded into the cassette.

A novel splicer assembly is provided that is arranged so that it may be mounted on the rear side of a panel that carries the splicing block assembly on its front side, with the splicer having (1) means for feeding a splicing tape on command, (2) means for cutting off a piece of splicing tape, and (3) a pivotally mounted applicator arm that is adapted to swing on its pivot from a first splicing tape-receiving position behind the panel to a second splicing tape-applying position in front of the panel.

Other features and many of the attendant advantages of the invention are set forth and are rendered obvious by the following detailed specification which is to be considered together with the accompanying drawings.

THE DRAWINGS

FIG. 8 is an enlarged side elevation, partly in section, of one of the splicing blocks;

FIGS. 18A–18C are fragmentary side elevational views of the shift block assembly sequentially illustrating its different operating positions during a cassette loading operation; and FIGS. 19A–19C are front elevational views of the shift block assembly in operating positions corresponding to those shown in FIGS. 18A–C.

DESCRIPTION OF RDAT CASSETTE

Figure 1:
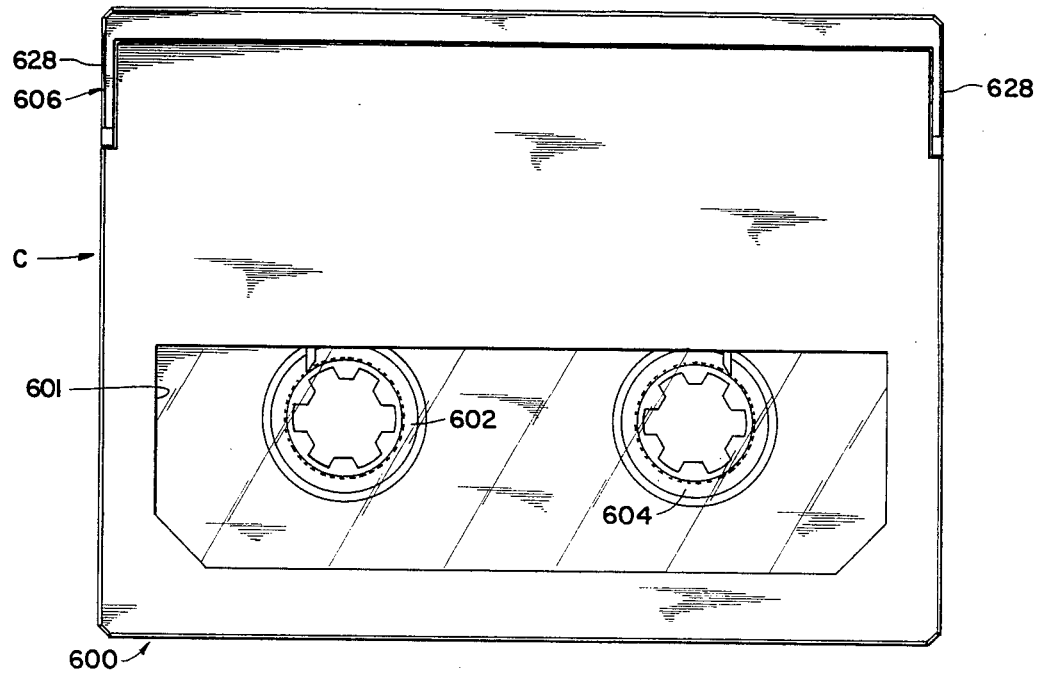
FIG. 1 is a front view of an RDAT cassette.
Figure 2:
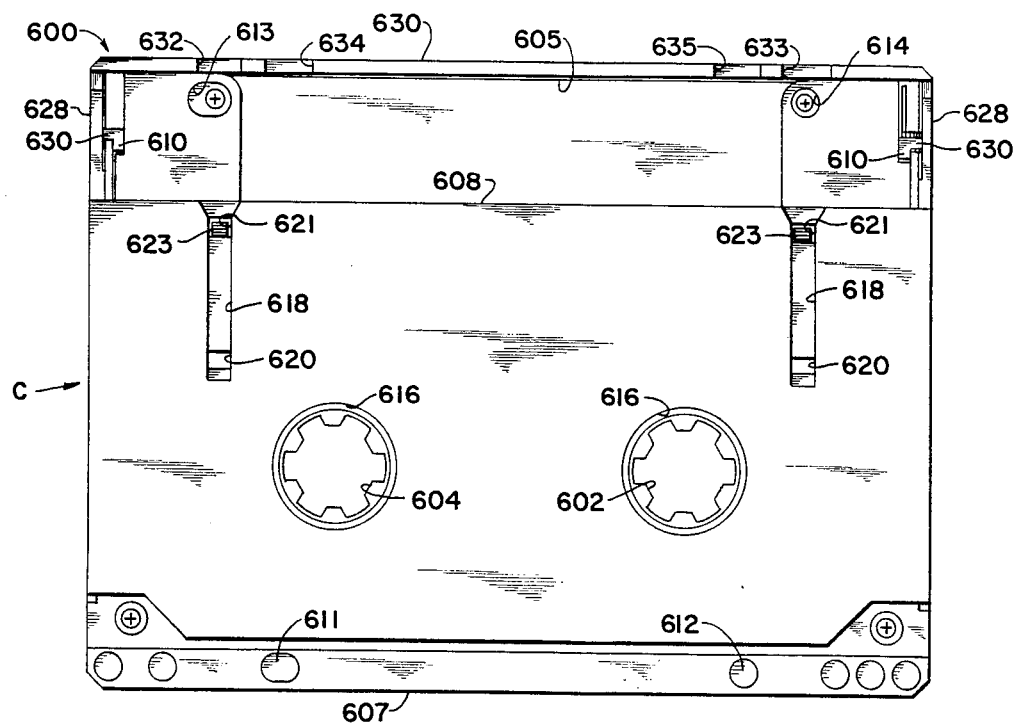
FIG. 2 is a rear view of the same cassette.
Figure 3:
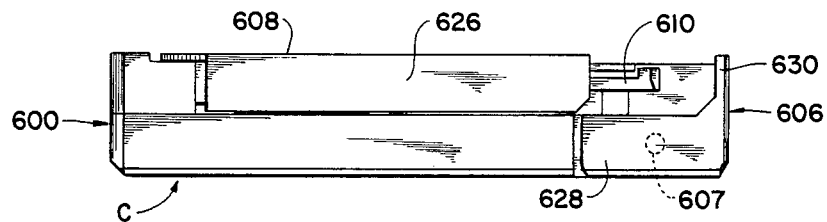
FIG. 3 is a side view of the same cassette.

Referring to FIGS. 1-3, a C-0 RDAT cassette C comprises a cassette case 600 having a transparent window 601 and containing a pair of rotatable hubs 602 and 604, with a leader tape 605 approximately 60 mm long extending between the two hubs, a door 606 that has its side walls pivotally mounted to the case at points represented at 607, a door locking mechanism comprising a slidable lid or cover 608, a hub locking mechanism comprising a pair of slidable L-shaped release members 610 at opposite ends of the cassette, and four depressions 611-614 on its rear side for receiving fixed cassette locater pins that hold the cassette in a predetermined position. The lid 608 has two large apertures 616, two grooves 618, and two small holes 620 and 621 at opposite ends of each groove. The lid is slidable between (1) an open position (shown in full lines in FIG. 2) in which apertures 616 are aligned with the toothed center holes of hubs 602,604 and the leader is exposed on the rear side of the cassette, and (2) a closed position in which the lid covers hubs 602,604, and engages the end wall 630 of door 606 so as to conceal the leader. The door locking mechanism further comprises a pair of spring biased pins 623 located inside the cassette that are positioned to fit in holes 620 or 621 and serve to lock lid 608 in its open or closed positions respectively. When the lid is closed, its opposite side walls 626 interfere with the opposite side walls 628 of door 606 and thereby prevent the door from being pivoted to open positions. The release members 610 have side flanges 630 that are engaged and moved to the right (as seen in FIG. 2) by the side walls 628 of door 606 when the latter is pivoted clockwise to open position, whereby the hubs are freed for rotation. The end wall 630 of door 606 has two relatively shallow edge slots 632,633 aligned with grooves 618,619 and two relatively deep edge slots 634,635 located between but adjacent to slots 632 and 633. These slots are utilized in unlocking and locking the lid. Further details of construction of the RDAT cassette are well known to persons skilled in the art.

GENERAL DESCRIPTION OF MACHINE EMBODYING THE INVENTION

FIGS. 4-20 of the drawings illustrate portions of an automatic cassette loading machine incorporating a preferred embodiment of the present invention that is specially adapted for loading "C-0" RDAT cassettes. However, it is to be understood that the invention may be modified for machines for loading other types of C-0 cassettes, e.g., Philips-type audio cassettes, VHS and Beta format video cassettes, 8 mm video cassettes, and other types of cassettes for containing computer data.

The drawings do not show all of the elements and details of construction of a complete cassette loading machine, since persons skilled in the art will readily appreciate what additional mechanisms and electrical controls are required to provide a complete and operative automatic cassette loader.

Turning now to FIGS. 4-11, the illustrated machine comprises a cabinet or console 2 having a front wall or panel 3 with an opening 4 in which is mounted a mounting plate or panel 5 that carries a shift block assembly identified generally at 8 and a splicer assembly identified generally at 700 (FIGS. 9-11) that includes a tape cutter mechanism hereinafter described. Mounting plate 5 is mounted to panel 3 by hinges 6, so as to permit access to components on the rear side of panel 5 for maintenance and repair. Also mounted on front panel 3 is a cassette-supporting station 12 for supporting cassettes to be loaded, a feeder mechanism 13 for feeding C-0 cassettes to cassette-support station 12, a cassette transport mechanism 14 which is adapted to pick up a single cassette from cassette-supporting station 12 and transport it to a predetermined position in front of a cassette holding and positioning plate 15 that is movably mounted in an aperture 9 in mounting plate 5, and a cassette holding and shifting mechanism 16 that is adapted to (1) receive a C-0 cassette from transport mechanism 14 and place it on plate 15, and (2) remove a loaded cassette from plate 15 and discharge it from the mechanism. Also releasably mounted in an opening in front panel 3 is an auxiliary panel 18 which supports portions of the control system (hereinafter described), including an electronic display unit 20, an on/off power switch 21, and a plurality of push-button type selection switches 22 that coact with the control system for selecting the amount of tape to be loaded into a cassette, performing selected test functions, e.g., individually testing operation of the splicer or shift block assembly, and initiating operation of the machine for automatic loading of cassettes. Front panel 3 also supports a supply reel shaft assembly 24 that is driven by a supply reel servo-motor 25 that is mounted on the rear side of front panel 3 and supports a supply reel 27 of use tape that is to be loaded.

As used herein, the term "use tape" signifies a magnetic tape that is to be loaded into a C-Zero cassette. The use tape may be a blank tape or a prerecorded tape.

Figure 4:
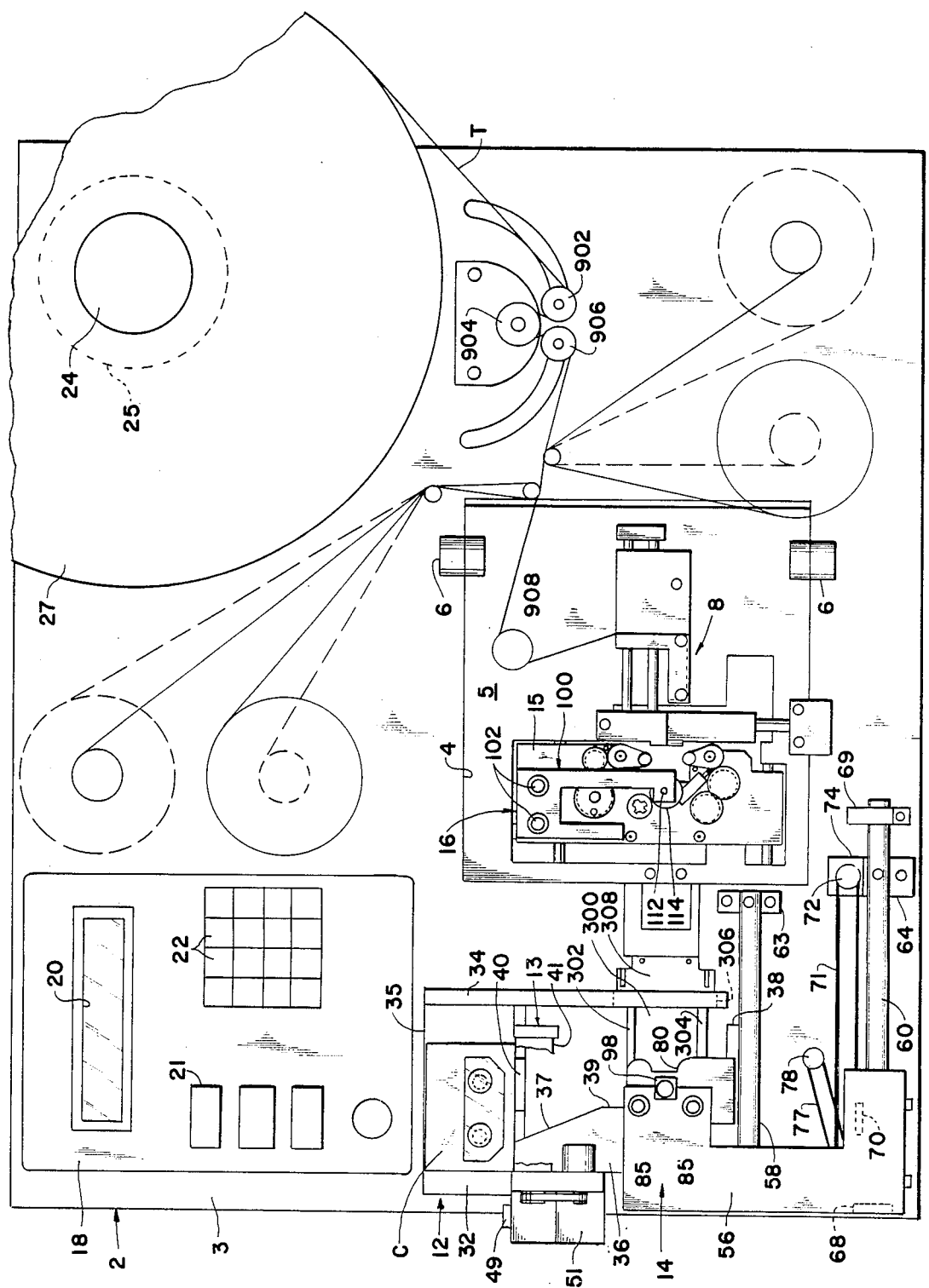
FIG. 4 is a front view in elevation of a cassette loading machine that incorporates an improved shift block assembly constructed in accordance with the present invention.

It is believed obvious that to the extent herein described, the machine illustrated in FIG. 4 is generally similar to prior cassette loading machines that are adapted to support a C-Zero cassette while conducting the necessary operations of extracting the leader tape from that cassette and placing it on a pair of splicing blocks, severing the leader tape into two leaders, splicing a first one of the leaders to the leading end of a use tape, winding the use tape and a first leader into the cassette to be loaded, terminating winding, cutting the use tape to form a trailing end and a new leading end, splicing the trailing end of the use tape to the second leader, pulling the trailing end of the use tape and the second leader into the cassette, discharging the loaded cassette from the machine, and conducting a new cycle of operation wherein a second C-Zero cassette is loaded with use tape commencing with the new leading end in the manner previously described.

CASSETTE SUPPORTING STATION 12

Figure 6:
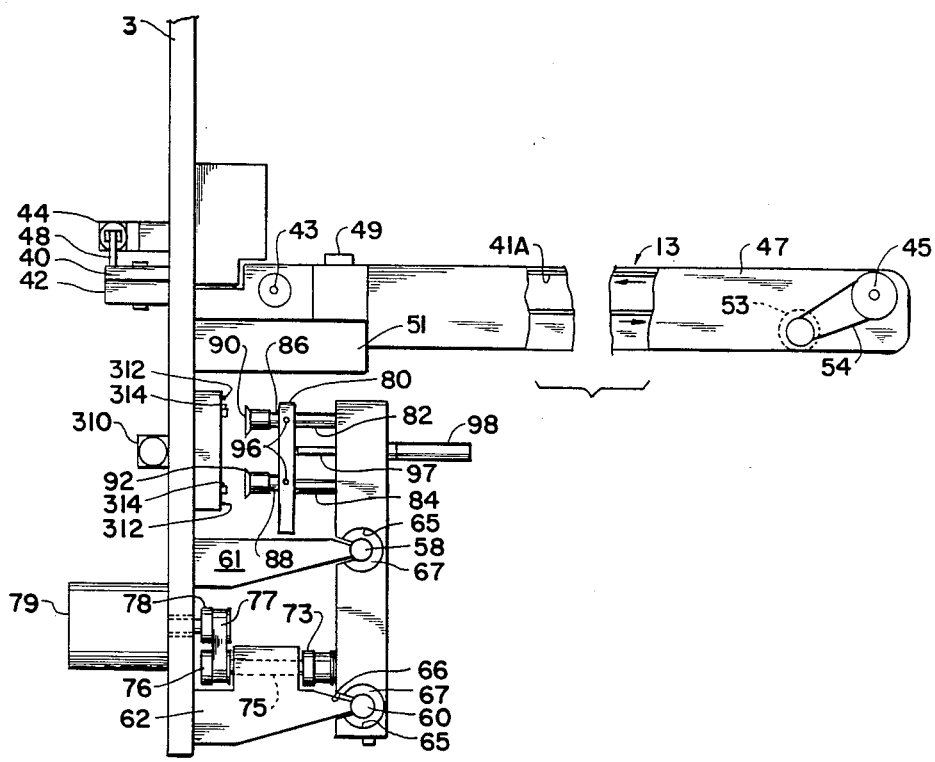
FIG. 6 is a fragmentary side elevation showing details of the cassette transport mechanism.

Referring now to FIGS. 4 and 6, cassette supporting station 12 is attached to front panel 3 and comprises a pair of vertically-extending guide members 32 and 34 attached to a plate 35 affixed to front panel 3, a stationary ledge/guide member 36, a stationary ledge 38 located between guide members 32 and 34, and a movable ledge 40 whose flat upper surface is even with the flat horizontal upper surface of stationary ledge 36. Movable ledge 40 projects through aligned openings in plate 35 and front panel 3 and is pivotally mounted on a support 42 affixed to the rear side of front panel 3. Ledge 40 is moved by a pneumatic cylinder-type actuator 44 that is secured to the rear side of panel 3 and has its reciprocating piston rod pivotally coupled to an arm 48 on ledge 40. Actuator 44 is used to pivot movable ledge 40 between (1) a forward cassette-supporting position wherein ledge 40 projects forwardly from plate 35 and (2) a retracted cassette-releasing position in which ledge 40 is retracted so as to be flush with or behind the front surface of plate 35. When ledge 40 is in its forward position, it coacts with the flat upper surface of stationary ledge 36 to intercept and support a C-0 cassette delivered by cassette feeder mechanism 13. When ledge 40 is moved to its retracted position, it releases a supported cassette for delivery by gravity to stationary ledge 38.

The side of ledge 36 facing guide member 34 has an upper inclined guide surface 37 and a lower vertical guide surface 39. It is to be noted that when a cassette C is moved onto movable ledge 40 and the upper end surface of ledge 36, as shown in FIG. 4, the cassette is oriented with its door 606 facing up. When ledge 40 is retracted, the cassette C tends to undergo a downward pivoting movement, with the upper end of ledge 36 acting as a pivot point. The side wall of the cassette opposite to door 606 swings down flat against inclined guide surface 37 and then the cassette slides down between guide surface 39 and guide member 34 onto stationary ledge 38, with the result that now the door 606 is facing cassette holding and shifting mechanism 16.

CASSETTE FEEDER MECHANISM

Cassette feeder mechanism 13 is an endless belt conveyor comprising an endless belt 41 mounted on two pulleys (not shown) that are carried by two shafts 43 and 45 (FIG. 6) mounted to a frame 47 that is pivoted at 49 to a support 51 carried by front panel 3. An electric stepping motor 53 attached to frame 47 drives belt 41 via a belt and pulley arrangement as shown at 54. The endless belt conveyor is located so that the upper run 41A of the endless belt extends close to but only slightly above movable ledge 40, and motor 53 drives the upper run of the belt toward front panel 3, with the result that a cassette on the upper run will be urged against plate 35 and down onto movable ledge 40. The endless belt conveyor is operated intermittently by stepping motor 53 according to signals from the electronic control system hereinafter described. It is to be noted that it is intended that cassettes are to be placed on belt 41 by suitable means (not shown) so that the cassettes are oriented with their doors facing up and their lids 608 facing toward front panel 3. The belt conveyor is pivotally mounted so that it can be swung away from cassette-supporting station 12 by an angle of about 140 degrees so as to permit access to the area immediately below movable ledge 40.

CASSETTE TRANSFER MECHANISM

Cassette transfer mechanism 14 comprises a carriage 56 that is slidably mounted on two parallel slide rods 58, 60 that are supported at their opposite ends by four cantilever support members 61, 62, 63 and 64. Rods 58 and 60 are supported in front of and parallel to front panel 3. Rods 58 and 60 are attached to the outer ends of cantilever supports 61–64 and carriage 56 has two horizontally-extending bores 65 that are intersected by elongated horizontal slots 66 cut in its rear surface. Bushings 67 are secured in bores 65 in close sliding relation with slide rods 58 and 60. Bushings 67 are slotted in alignment with slots 66, and all of the slots are sized so as to slidably accommodate the outer ends of supports 61–64, thereby maximizing the length of travel of carriage 56 on the slide rods. The opposite ends of slide rod 60 extends through holes in two stop members 68,69 affixed to front panel 3. The extent of travel of carriage 56 on slide rods 58,60 is determined by engagement of the carriage with the stop members.

Carriage 56 has a rearwardly projecting arm 70 (FIG. 4) that is fastened to a toothed endless belt 71 carried by two toothed pulleys 72 and 73. Pulley 72 is an idler and forms part of a pulley unit 74 that is affixed to front panel 3. Pulley 73 is locked to one end of a shaft 75 that is rotatably mounted in an extension of cantilever support 62. A third toothed pulley 76 is affixed to the rear end of shaft 75 and carries a short endless belt 77 that also rides on and is driven by a fourth toothed pulley 78 mounted to front panel 3. The latter is affixed to the output shaft of a reversible electric motor 79 that is mounted on the rear side of front panel 3. Motor 79 operates in response to a command signal from the electronic controller to cause carriage 56 to move back and forth between a first cassette-pickup position (determined by stop member 68) in front of cassette-supporting station 12 and a second cassette-release position (determined by stop member 69) in front of cassette holding and positioning plate 15.

Movably supported by carriage 56 is a cassette pickup and release mechanism comprising a transport plate 80 carrying a pair of slide rods 82, 84 that are slidably mounted in bushings 85 (FIG. 4) positioned in holes in carriage 56, and a pair of hollow tubes 86,88 having flexible rubber suction cups 90,92 at their rear ends. The front ends of tubes 86,88 are closed off by plugs, and plate 80 has two transversely-extending bores that connect with side holes (not shown) in tubes 86,88 and at their outer ends are fitted with hose fittings 96 that are connected by hoses (not shown) to a source of vacuum (not shown) by suitable electrically-controlled air valves (also not shown). Transport plate 80 is moved toward and away from front panel 3 by the piston rod 97 of a pneumatic actuator 98 (FIG. 6) affixed to carriage 56. Actuator 98 is a double-acting actuator, i.e., its piston rod is moved in either direction by pressurized air. The cylinder of actuator 94 is alternatively connected to a source of pressurized air or the atmosphere by a hose line (not shown) and an electrically-operated valve (also not shown). When pressurized air is applied to one end of actuator 98, its piston rod is extended and plate 80 is moved toward front panel 3 far enough for its suction cups 90,92 to engage a cassette supported on lower ledge 38 of cassette-supporting station 12. When pressurized air is applied to the other end of actuator 98, its piston rod is retracted so as to move plate 80 away from panel 3 far enough to permit a cassette held by suction to cups 90,92 to clear ledge 38 and guide member 34, whereby the cassette can be moved by carriage 56 laterally to a position in front of plate 15. It is to be noted that suction cups 90,92 engage the front side of the cassette closer to its ends wall 607 than its door 606.

CASSETTE LID OPENING MECHANISM

Referring to FIGS. 4 and 6, means are provided for unlocking the cassette lid and moving it to open position while it is sitting on lower ledge 38. To this end plate 35 is recessed in the region between right hand guide 34 and the vertical edge portion 39 of left hand guide 32. The recessed region 300 is rectangular, having its bottom edge above ledge 38 and its upper edge below the intersection of edge surfaces 37 and 39 of guide 32. Two slide rods 302 and 304 are disposed in the recess 300, with the left hand ends of the rods being anchored in plate 35 behind left hand guide 32. The right hand ends of rods 302 and 304 extend through a large aperture 306 in right hand guide 34. Slidably mounted on rods 302,304 is a lid unlocking and opening block 308. A horizontally-extending pneumatic actuator 310 (FIG. 6) is attached to the rear side of front panel 3, and the piston rod of that actuator is attached to block 308 via an elongated hole (not shown) in front panel 3. Operation of actuator 310 will cause block 308 to move from a first at-rest limit position in which it is to the right of guide 34 (FIG. 4) and a second limit position in which it is between guides 32 and 34. The front side of block 308 is provided with two relatively low elongated ridges or ribs 312 and two relatively high projections 314 that are disposed further to the right and between ribs 312. Ribs 312 are sized to fit in slots 632 and 633 of the cassette cover, while projections 314 are sized to fit in slots 634 and 635 of the same cover.

Assuming that a cassette is disposed on ledge 38 between guides 32 and 34, movement of block 308 from its at-rest position (FIG. 4) to its second limit position will cause the following sequence of steps to occur: (1) ribs 312 will pass through slots 632 and 633 into grooves 618, depressing pins 623 so as to unlock lid 608, (2) projections 314 will pass through slots 634 and 635, engage the end edge of lid 608, and then push the lid to open position so that it will be locked there automatically by pins 623, and (3) because of the lid being locked in open position, projections 314 will force the cassette up against the vertical surface 39 of the left hand guide member 36. Step (3) is important because it assures that each cassette dropped onto ledge 38 will be in exactly the same position when it is picked up for delivery to the cassette holding and positioning plate 15.

CASSETTE HOLDING AND SHIFTING MECHANISM

Figure 5:
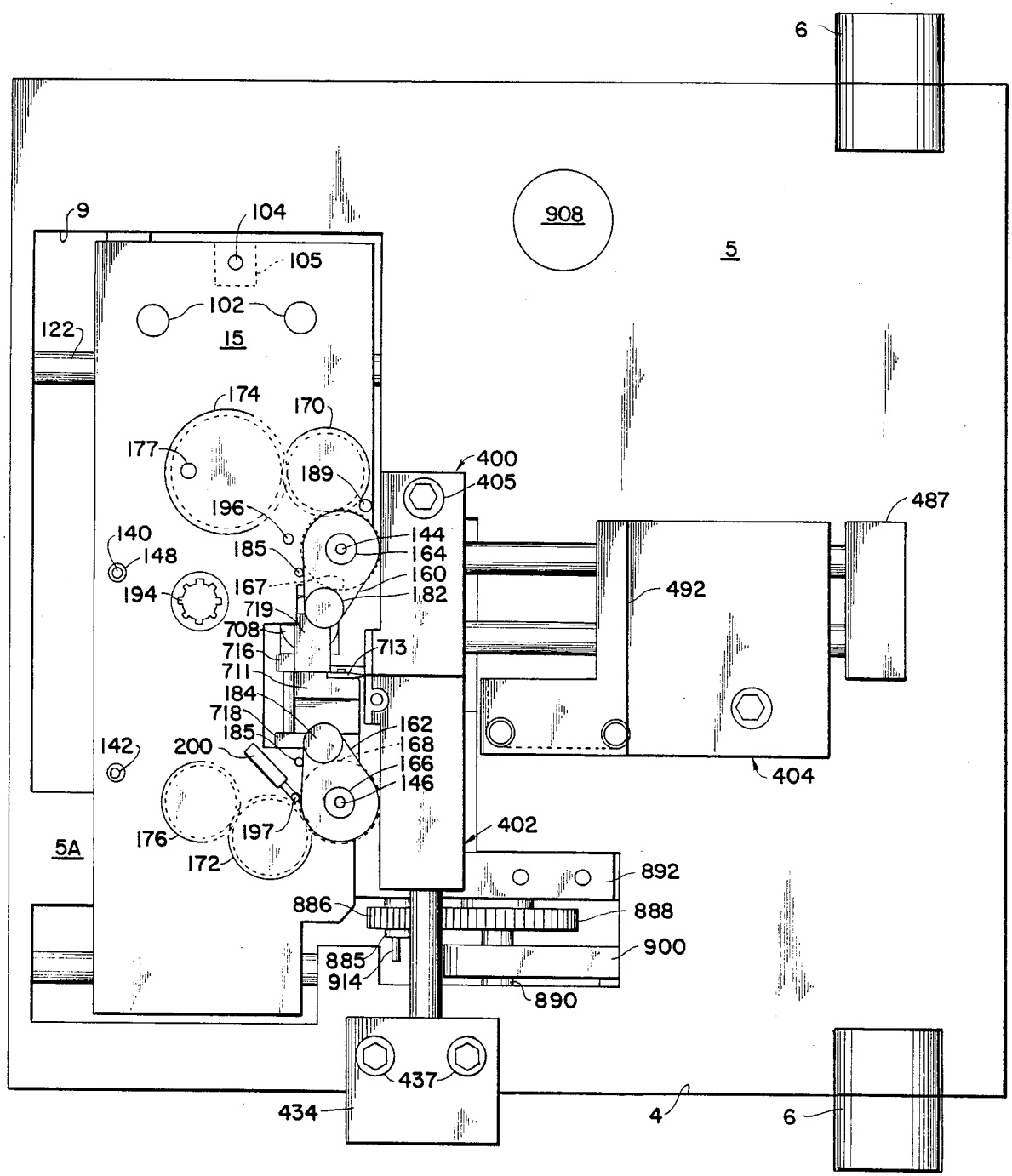
FIG. 5 is a fragmentary front elevation on an enlarged scale showing details of the cassette-supporting station.
Figure 9:
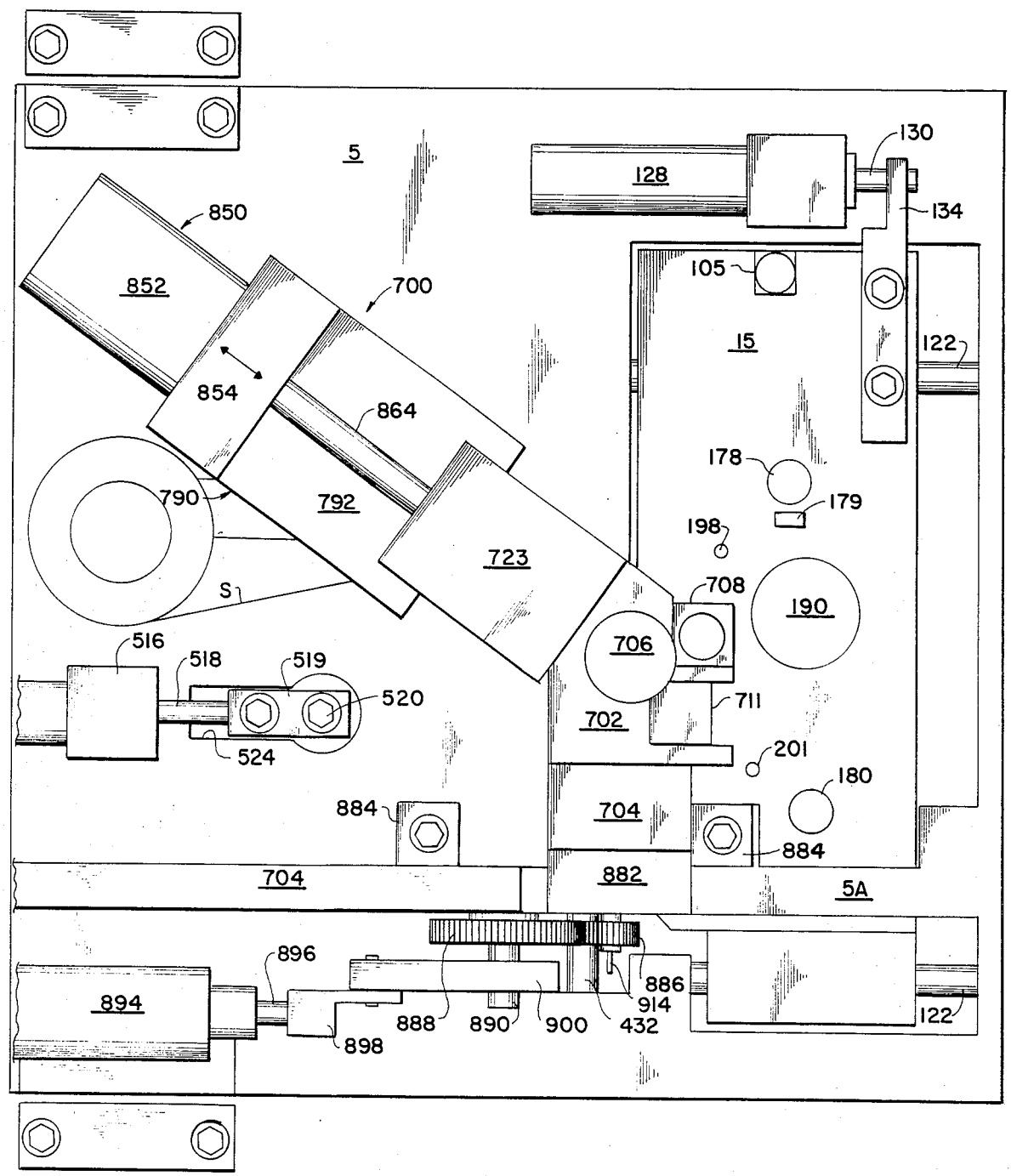
FIG. 9 is an enlarged rear elevation of a portion of the front panel of the machine, the hinged mounting plate for the splicing block assembly, and the splicer mechanism for applying splicing tape to a leader and use tape to be spliced, with certain elements omitted for clarity.

Referring now to FIGS. 4, 5 and 9, cassette holding and shifting mechanism 16 comprises a carriage 100 that is mounted for reciprocal movement on two slide rods 102, that are anchored in and extend forwardly from cassette holding and positioning plate 15. Carriage 100 is attached to the end of the piston rod 104 of a pneumatic actuator 105 that is mounted on the rear side of plate 15. Piston rod 104 extends through a hole in plate 15. When piston rod 102 is retracted, carriage 100 is positioned adjacent to but spaced from plate 15. When piston rod 104 is extended, carriage 100 is spaced far enough from front panel 3 to permit a cassette carried by suction cups 90,92 to be located between carriage 100 and mounting plate 5. Carriage 100 carries a hollow tube 112 (FIG. 4) that has a suction cup 114 on its front end and is closed at its rear end. Tube 112 has a side port leading to an interior passageway (not shown) in carriage 100, which in turn has a side port (not shown) connected by a hose line (not shown) to a source of vacuum (not shown) via a suitable electrically operated air valve (also not shown). Carriage 100 is arranged so that when a cassette C carried by transport plate 80 is positioned in front of it, and plate 80 is moved toward front panel 3 so as to place the cassette on locator pins 140, 142, 144 and 146, carriage 100 will move forward with plate 80 far enough for its suction cup 114 to engage the cassette and hold it by suction. Then the vacuum connection to cups 90, 92 of transport plate 80 is terminated so as to release the cassette from those cups and permit it to be held solely by suction cup 114. It is to be noted that suction cup 114 is located so as to engage the cassette to the right of suction cups 90,92 and to the left of door 606. Transport plate 80 is retracted after the cassette is engaged by suction cup 114, and actuator 104 keeps carriage 100 in its extended position so as to keep the cassette on the four locator pins.

CASSETTE POSITIONING MECHANISMS

Referring now to FIGS. 4, 5 and 9, cassette holding and positioning plate 15 is designed to support a C-Zero cassette delivered from cassette magazine 12 (not shown) and shift that cassette to a predetermined cassette loading position adjacent the shift block assembly. Plate 15 is mounted for reciprocation in aperture 9 on a pair of horizontally disposed rods 122 that are mounted to mounting plate 5. Plate 15 is moved by a pneumatic actuator 128 (FIG. 9) whose cylinder is secured to the rear side of mounting plate 5 and whose piston rod 130 is connected to a bracket 134 that is attached to the rear side of the plate 15. Actuator 128 is adapted to shift the cassette holder plate 15 from a first position spaced a short distance from the splicing block head to a second position adjacent the splicing block head, all as more particularly described hereinafter. In FIGS. 5 and 9, plate 15 is shown in its second position adjacent the splicing block head.

Cassette holder plate 15 is provided with four locater pins 140, 142, 144 and 146 that project forwardly from the holder plate and are adapted to mate with the four locater holes 611, 612, 613 and 614, respectively in the rear side of the cassette to be loaded. Locater pins 140 and 142 are fixed to plate 15. The forward ends of the locater pins are tapered and have a reduced diameter so as to form shoulders 148 that engage the rear surface of the C-Zero cassette to be loaded and thus limit penetration of the pins into the cassette locater holes.

Referring again to FIGS. 5 and 9, extraction of the leader from a cassette to be loaded is accomplished by a pair of tear-drop shaped arms 160 and 162 that are rotatably mounted on shafts 164 and 166 that are mounted in plate 15. Pins 144 and 146 are mounted in blind holes in the front ends of shafts 164 and 166. Two small pinion gears 167 and 168 are rotatably mounted on the shafts 164 and 166 between arms 160 and 162 respectively and plate 15. Gears 167 and 168 are locked to arms 160 and 162 and engage and rotate with two spur gears 170 and 172 that are rotatably mounted on stub shafts mounted in plate 15. Spur gears 170 and 172 are engaged and rotated by drive gears 174 and 176 respectively that are affixed to the output shafts of two reversible electric motors 178,180 respectively, mounted on the rear side of plate 15 (FIG. 9). Motors 178 and 180 control rotational movement of arms 160 and 164 respectively. Arms 160 and 162 carry leader extractor rollers 182 and 184 at their free ends. Two stop pins 185 are affixed to and project forwardly from plate 15. Pins 185 are located so as to be engaged by and stop extractor arms 160 and 162 when the latter are rotated clockwise and counterclockwise respectively. In FIGS. 4 and 5, the arms 160 and 162 are shown in their at-rest positions, i.e., the position they would be in when a new C-Zero cassette is delivered to holder plate 15 to begin a new loading cycle. When leader extractor motors 178 and 180 are energized, arms 160 and 162 rotate counterclockwise and clockwise respectively so as to cause rollers 182,184 to engage and pull out the leader of the new cassette and extend it over the first and second splicing blocks hereinafter described.

The extent of rotation of arms 160 and 162 when extracting a leader is determined by engagement of the leader tape with the first and second splicing blocks. Preferably current sensing means (not shown) coupled to motors 178 and 180 are used to (1) sense the increase in current that occurs when further rotation of the arms is stopped by the resistance that results from the fact that the leader has been fully pulled out of the cassette or further movement of the extractor arms is prevented by the splicing block assembly, and (2) stop the motors when the current exceeds a predetermined amplitude level. In this connection it is to be appreciated that internal or external mechanical stop means may be used to limit rotation of extractor arms 160 and 162 toward the splicing block assembly. Gear 174 is provided with a hole 177 to receive the piston rod of a pneumatic actuator 179 attached to the rear side of plate 15. When actuator 179 is off, its piston rod is retracted out of hole 177 and gear 174 is free to be rotated by motor 178. When actuator 179 is operated, its piston rod is extended into hole 177 and thereby locks gear 174 against rotation. The piston rod of actuator 179 is placed in its extended gear-locking position only when arm 160 has been shifted counter-clockwise to a position adjacent to but spaced slightly from the splicing block assembly, so as to permit roller 182 to act as a guide when magnetic tape is being wound onto a cassette.

Cassette positioning plate 15 also carries a cassette takeup spindle servomotor 190 on its rear side. The output shaft of motor 190 is coupled to a tape takeup spindle 194 that is rotatably mounted in plate 15. The forward end of spindle 194 is splined as shown to mate with the hub 602 of a C-Zero cassette.

Plate 15 carries a forwardly projecting pin 189 that is positioned to push open the door of a cassette as the latter is pushed onto locater pins 140, 142, 144 and 146.

Plate 15 also carries means for unlocking lid 608 when it is in open position, so as to allow it to close automatically. Such means comprises two unlocking pins 196 and 197 (FIG. 5). Pin 196 is actually the piston rod of a small pneumatic actuator 198 (FIG. 9) affixed to the rear side of plate 15. Pin 196 is slidably disposed in a hole in plate 15 and is normally retracted so that it protrudes from plate 15 only a small fraction of an inch. Pin 197 is affixed to an arm 200 that is affixed to the piston rod of a second pneumatic actuator 201 (FIG. 9) attached to the rear side of plate 15. The piston rod of actuator 200 projects slidably through on hole in plate 15 and is normally retracted so that the front end of pin 197 is only a small fraction of an inch in front of plate 15. When actuators 198 and 201 are operated, pins 196 and 197 will move forward to depress pins 623 of the cassette that is supported by locater pins 140, 142, 144 and 146, so that when carriage 100 is moved away from plate 15 with the cassette held by suction to cup 114, the lid will automatically close as it clears the rollers on the two extractor arms.

SPLICING BLOCK ASSEMBLY

Splicing block assembly 8 is mounted on the front side of mounting plate 5 and comprises three splicing blocks 400, 402 and 404. As seen best in FIGS. 5 and 7-10, splicing block 400 is affixed to the mounting panel 5 by means of a threaded fastener 405 which extends through a hole in the block and is screwed into a threaded opening in mounting panel 5. Splicing block 400 has a flat bottom surface 407, a flat front surface 408, flat side surfaces 409 and 410, and a rear extension 412 having a flat surface 414 that is engaged with the panel 5. At its side surface 409, splicing block 400 is provided with a raised platform 416 that is characterized by flat upper and lower surfaces 418 and a groove 420 having a flat bottom surface 422. Groove 420 is essentially U-shaped in cross-section and its flat bottom surface 422 has a plurality of slits 424 that connect with an interior chamber (not shown) that has a port 426 in front surface 408 of the splicing block. Port 426 is provided with a hose fitting 428 (FIG. 18A) that is adapted to be attached to a suitable hose (not shown) that leads to a source of vacuum (not shown) via a suitable electrically-operated control valve (also not shown). Groove 420 functions as a tape guide channel.

Figure 18B:
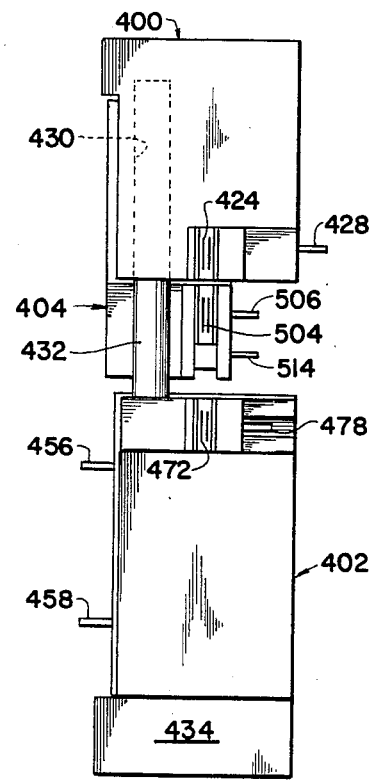
Figure 19B:
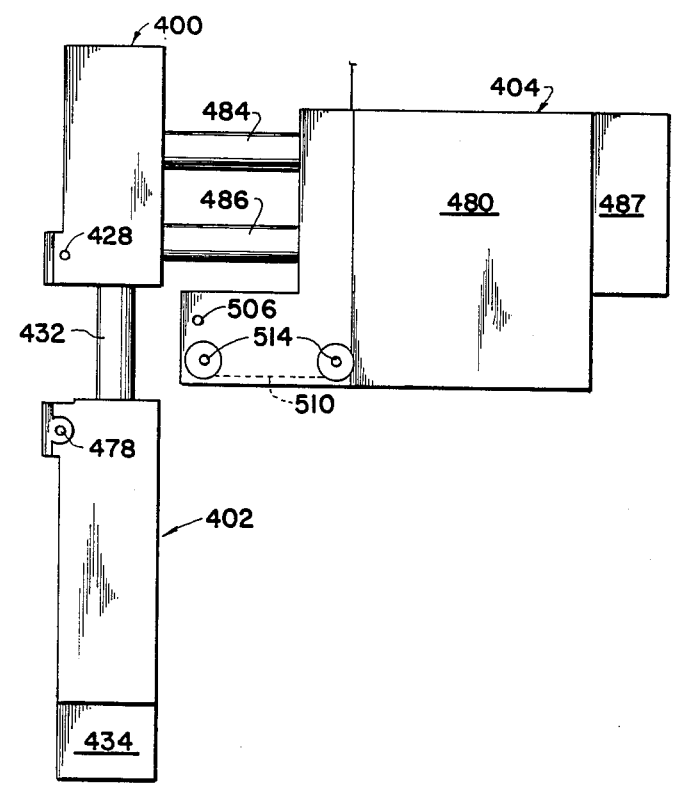
Figure 18C:
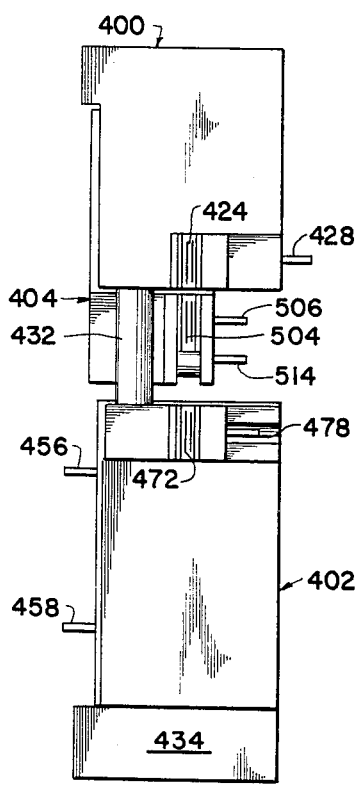
Figure 19C:
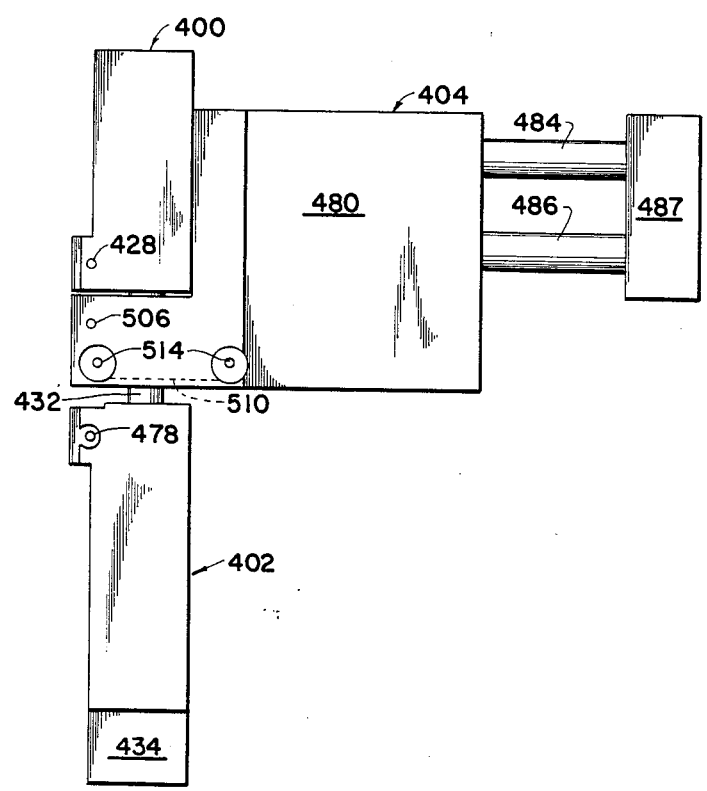

As seen best in FIG. 18B, splicing block 400 is provided with a blind hole 430 to slidably accommodate upper end of a slide rod 432. The bottom end of slide rod 432 is anchored in a mounting block 434 that is attached to the front side of mounting panel 5. A second shorter slide rod 436 also has its bottom end anchored in a hole in mounting block 434. Mounting block 434 is attached to front panel 5 by suitable threaded fasteners 437 that pass through holes 438 in the mounting block.

Figure 7:
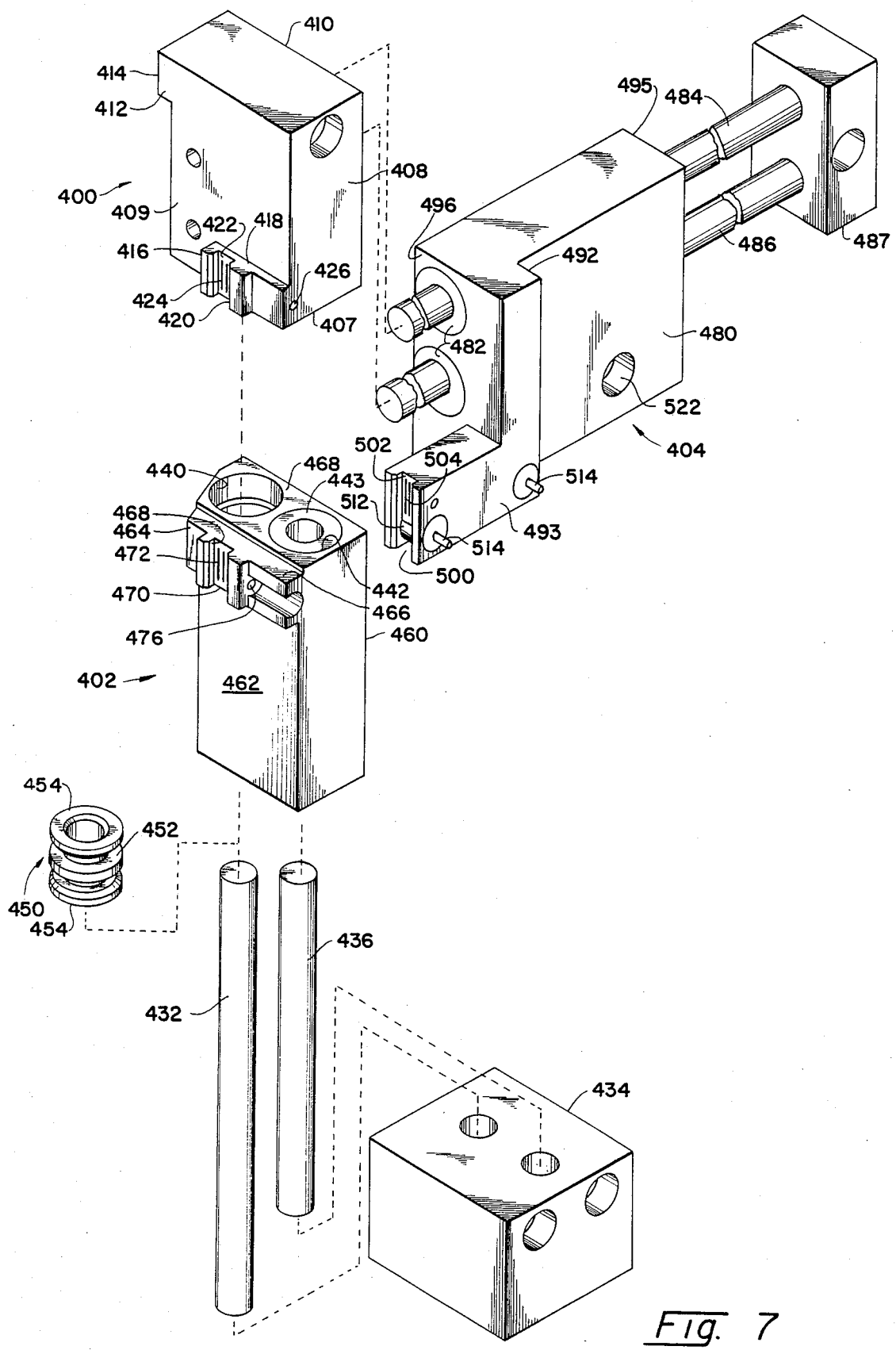
FIG. 7 is an exploded view of the shift block assembly showing its three shift blocks and the shafts on which two of the shift blocks are mounted.

Splicing block 402 has a pair of parallel axially-extending bores 440 and 442 respectively (FIG. 7). Bore 442 is provided with bushings 443 (FIGS. 7,8) at its upper and lower ends that are sized to make a close sliding fit with slide rod 436. Bore 440 also is provided with bushings 443 to slidably accommodate slide rod 436. End seals 459 are disposed adjacent bushings 443. A pair of grooves are provided in bore 440 adjacent its upper and lower ends to accommodate a pair of snap rings 444 that retain the end seals 459. Mounted on slide rod 432 and disposed within bore 440 is a sealing unit comprising a sleeve 450, two resilient ring seals 452 that are sized to make a smooth close sliding fit with the surrounding surface of the splicing block, and two end flanges 454. The two flanges 454 do not touch the surface that defines bore 432. The sealing unit is press-fitted onto the rod 432 so that it is incapable of moving axially relative to the rod. Additionally, the splicing block has two side ports on its rear side that are fitted with hose fittings 456 and 458 respectively. These fittings are adapted to be connected by hoses (not shown) to a suitable source of pressurized air or the atmosphere (not shown) via a suitable valving mechanism (also not shown). When pressurized air is supplied to the hose fitting 456 and hose fitting 458 is connected to the atmosphere, the pressurized air entering the hose fitting 456 will cause the splicing block 402 to move up on slide rods 432 and 436. Similarly, if the hose fitting 458 is connected to pressurized air and hose fitting 456 is connected to the atmosphere, the increase in pressure on the lower side of the sealing unit will cause splicing block 402 to move downward on slide rods 432 and 436. The length of travel of the splicing block on slide rods 432 and 436 is limited at one end by engagement of the flat upper surface of splicing block 402 with the flat under surface 407 of splicing block 400, and at the other end by engagement of the flat under surface of splicing block 402 with mounting block 434.

Still referring to FIGS. 7, 18A–C and 19A–C, splicing block 402 has flat side surfaces 460 and 462, and the latter side is provided with a raised platform 464 having a flat upper surface 466 and a groove 468 that has a flat bottom surface 470 provided with a plurality of narrow slits 472. Slits 472 communicate with an interior chamber (not shown) that has a side port 476. The latter is fitted with a hose fitting 478 (FIGS. 8 and 18A) that is adapted to be connected by a suitable hose (not shown) to a source of vacuum (not shown) via a suitable valving mechanism (also not shown). It is to be noted that the upper surface 466 of the platform 464 is offset from the upper surface 469 of splicing block 402, so that when splicing block 402 is brought up into engagement with splicing block 400, a groove will exist between the upper surface 469 of platform 464 and the lower surface 407 of splicing block 400. That groove serves to accommodate a knife blade that is used to sever the leader tape of a C-0 cassette or the use tape that is wound into a cassette. Further details of the cutter mechanism are presented hereinafter.

Still referring to FIGS. 7, 18A–C and 19A–C, splicing block 404 is formed with a main body portion 480 having a pair of parallel bores that are fitted with bushings 482 at each of its opposite ends for the purpose of accommodating a pair of slide rods 484 and 486. One end of each of the slide rods is secured in a mounting block 487 that is bolted to mounting panel 5. The opposite ends of slide rods 484 and 486 are anchored in suitable holes formed in splicing block 400. Splicing block 404 also has a forwardly projecting shoulder 492 that in turn has a platform 493 that projects at a right angle from the block. Splicing block 404 has flat side surfaces 495 and 496 so as to permit the block to be brought into engagement with the adjacent flat side surfaces of mounting block 487 and splicing block 400. The platform 493 is provided with a groove 500 that has a flat bottom surface 502 provided with a plurality of narrow slits 504 that connect with an interior chamber (not shown) in the platform. That interior chamber has a side port that is provided with a fitting 506 (FIG. 18B) for a hose (not shown) used to connect the interior chamber to a suitable vacuum source via suitable electrically operated valve means. The dimension of the platform 493 measured from left to right in FIGS. 7 and 19A–C, is such that when the end surface 496 of splicing block 404 engages the side surface 410 of splicing block 400, the bottom surface 502 of groove 500 will be in planar alignment with the bottom surfaces 422 and 470 of grooves 420 and 468 of the other two splicing blocks. Platform 493 is located adjacent the bottom edge of the splicing block 404 so that it can pass beneath the lower surface 407 of splicing block 400 when splicing block 404 is moved so as to bring its end surface 496 into engagement with splicing block 400.

It is to be noted that the length of travel of splicing block 404 along slide rods 484 and 486 is such as to (1) permit the flat bottom surface of its groove 502 to be in planar alignment with the corresponding bottom surfaces of grooves 420 and 468 when the splicing block 404 is at one end of its path of travel (FIGS. 18C, 19C), and (2) permit the platform 493 to be retracted fully out of the path of movement of splicing block 402 when the block 404 is at the other end of its path of travel (FIG. 13B).

It is to be noted that splicing block 404 has a groove 510 in its underside in alignment with the groove 502. Additionally splicing block 404 is provided with two air bearing-type tape guide rolls 512 that have hose fittings 514 for connection to a source of air. Guide rolls 512 are mounted so that their peripheries are tangent to groove 510.

Turning now to FIG. 9, movement of splicing block 404 along slide rods 484 and 486 is accomplished by means of a pneumatic actuator whose cylinder 516 is affixed to the rear side of panel 5. The piston rod 518 of actuator 516 is attached by means of a coupling bracket 519 to the rear side of the splicing block body by means of a fastener 520 that extends through a hole 522 in the splicing block and is attached to the bracket. The fastener 520 extends through an elongated hole 524 in mounting panel 5, the hole 524 being long enough to facilitate movement of the splicing block 404 according to the limits of travel hereinabove described. If desired, bracket 518 may extend into hole 524 and the latter may have a length (i.e., horizontal dimension as viewed in FIG. 5) that is set so that engagement of bracket 518 with the opposite ends of the hole will determine the extent of movement of the splicing block. The cylinder 516 is connected by suitable means (not shown) to a source of pressurized air (not shown) via suitable electrically operated valve means (also not shown).

TAPE SPLICER AND CUTTING MECHANISM

Mounted on the rear side of cassette holding plate 15 is a sub-assembly comprising a tape splicer mechanism 700. The splicer is similar in some respects to, but is an improvement over, the splicer shown in U.S. Pat. No. 4599130, issued July 8, 1986 to George M. Woodley, for "Splicing Tape Dispenser-Applicator". The splicer of the present invention is different in that it is a transfer-type splicer, i.e., a splicer that cuts and delivers a piece of splicing tape onto a tape-applying member located in a first position, and then uses the tape applying member to transfer the tape to two abutting tapes to be joined at a second position remote from the first position.

As seen best in FIGS. 9–16, the tape splicer mechanism comprises a mounting block 702 and a bearing block 882. Block 702 has a depending extension 703 that is releasably secured to the rear side of bearing block 882 by suitable threaded fasteners (not shown). Bearing block 882 has a pair of ears 884 that are bolted to mounting plate 5. The latter has a horizontal extension 5A, to which one of the ears 884 is bolted. Also attached to block 882 is a mounting bar 704. Mounting block 702 is cut in several ways so as to provide spaces for a splicer tape cutter actuator 706, a magnetic tape/leader tape cutter actuator 708, a splicing tape cutter support 707 carrying a replaceable cutter blade 709, and a magnetic tape/leader tape cutter support 711 carrying a removable cutter blade 713. Actuator 708 is bolted to the rear side of mounting block 702 and its piston rod is slidably disposed in a bore 714 in block 702 that is perpendicular to plate 5. The front end of the piston rod of actuator 706 is attached to the rear end of cutter support 707. The latter is slidably disposed in a rectangular groove 715 in block 702. Actuator 708 is bolted to a lateral projection 716 of block 702. Cutter support 711 is slidably disposed in a rectangular groove defined in part by projection 716 and a flat surface 718. The front end of the piston rod of actuator 708 has a reduced diameter and is threaded so that it may be secured by a nut 720 to a bracket 719 affixed to cutter support 711, so that operation of the actuator will cause the cutter support to reciprocate along an axis that is perpendicular to mounting plate 5.

The splicer also comprises a splicer block 723 that is bolted to mounting block 702 and which is provided with a flat end face 724 having a shallow arcuate groove 725 that extends rearwardly far enough to intersect an inclined bore 726 which terminates at a surface 728 having a suitable hose fitting 730. A blind hole 732 also is formed in end surface 724. Blind hole 732 intersects an inclined bore 734 that terminates in the end surface 728 in a suitable hose fitting 736. Still another blind hole 738 is formed in surface 724. Blind hole 738 is sized to receive an axle 740. Axle 740 is rotatable in hole 738. An applicator wheel 742 is press-fitted onto one end of axle 740 and will rotate as a unit with the axle. A ratchet wheel 750 with five teeth is secured to the front end of axle 740 by fitting onto the square or rectangular front end 752 of the axle. The ratchet wheel is secured to the axle by means of a screw 752 that screws into a tapped hole in the front end of the axle. The ratchet wheel resides adjacent to but slightly spaced from a bracket 760 that is secured to block 723 by means of a plurality of fasteners 761 that screw into tapped holes in block 723. Bracket 760 has a platform or raised portion 764 on the side facing block 723, so as to provide a gap to accommodate the applicator wheel 742. The applicator wheel is between block 723 and the offset lower surface 766 of bracket 760, with the rear surface of the applicator wheel making a sliding contact with the end surface 724 of block 723, while the front surface is spaced from bracket 760, so that the applicator wheel can rotate with the axle and the ratchet wheel 750.

Applicator wheel 742 is pentagonal in shape and is formed out of a rigid metallic core 770 having a resilient peripheral rim cover 772. Wheel 742 has five peripheral faces 780A-E, five parallel blind holes 782A-E extending inward from its rear side 783 and intercept five radial bores 784A-E that extend inwardly from the peripheral faces 780A-E respectively. Face slits 786 are formed in the peripheral faces 780A-E respectively and intercept the radial bores 784A-E respectively. It is to be noted that the applicator wheel 742 is mounted on the axle so that its five corners, i.e., the intersections of its peripheral faces are aligned exactly half way between the teeth 753A-E of ratchet wheel 750.

When the wheel and ratchet assembly are disposed so that hole 732 of block 723 is not in communication with any of the blind holes 782A-E, the arcuate slot 725 will be in communication with three of the applicator wheel holes, e.g., 782A-C, and the surface 724 of block 723 will close off the other two applicator wheel holes, e.g., 782D and 782E. Accordingly, if suction is applied to the hose fitting 736 while the wheel and ratchet assembly are disposed in the foregoing position, the suction will not make its way to any of the applicator wheel surfaces. At the same time, however, if suction should be applied to hose fitting 730, suction will be transmitted to applicator wheel surfaces 780B-D via arcuate groove 725 and applicator wheel holes 782B-D. No suction will be transmitted to wheel faces 780A and E via hose fitting 730 since wheel holes 728A and E are blocked by the end surface 724 of block 723.

Furthermore, if the wheel and ratchet sub-assembly are rotated clockwise from the foregoing position a distance equal to ½ the length of a wheel face, the hole 732 of block 723 will be in communication with the applicator's wheel hole 782A, the arcuate groove 725 of block 723 will be in communication with the applicator wheel holes 782B-D, and the end surface 722 of block 720 will close off the applicator wheel's hole 782E. Accordingly, if suction is applied to the fitting 736 while the wheel and ratchet assembly is disposed in this new position, the suction will be transmitted along bore 734, out of hole 732, into the wheel hole 782A, along the radial wheel hole 784A, and out to wheel face 780A. If at the same time suction is applied to hose fitting 730, suction will be transmitted to the applicator wheel's faces 780B-D via, in turn, the bore 726, arcuate groove 725, and wheel holes 782B-D.

Figure 10:
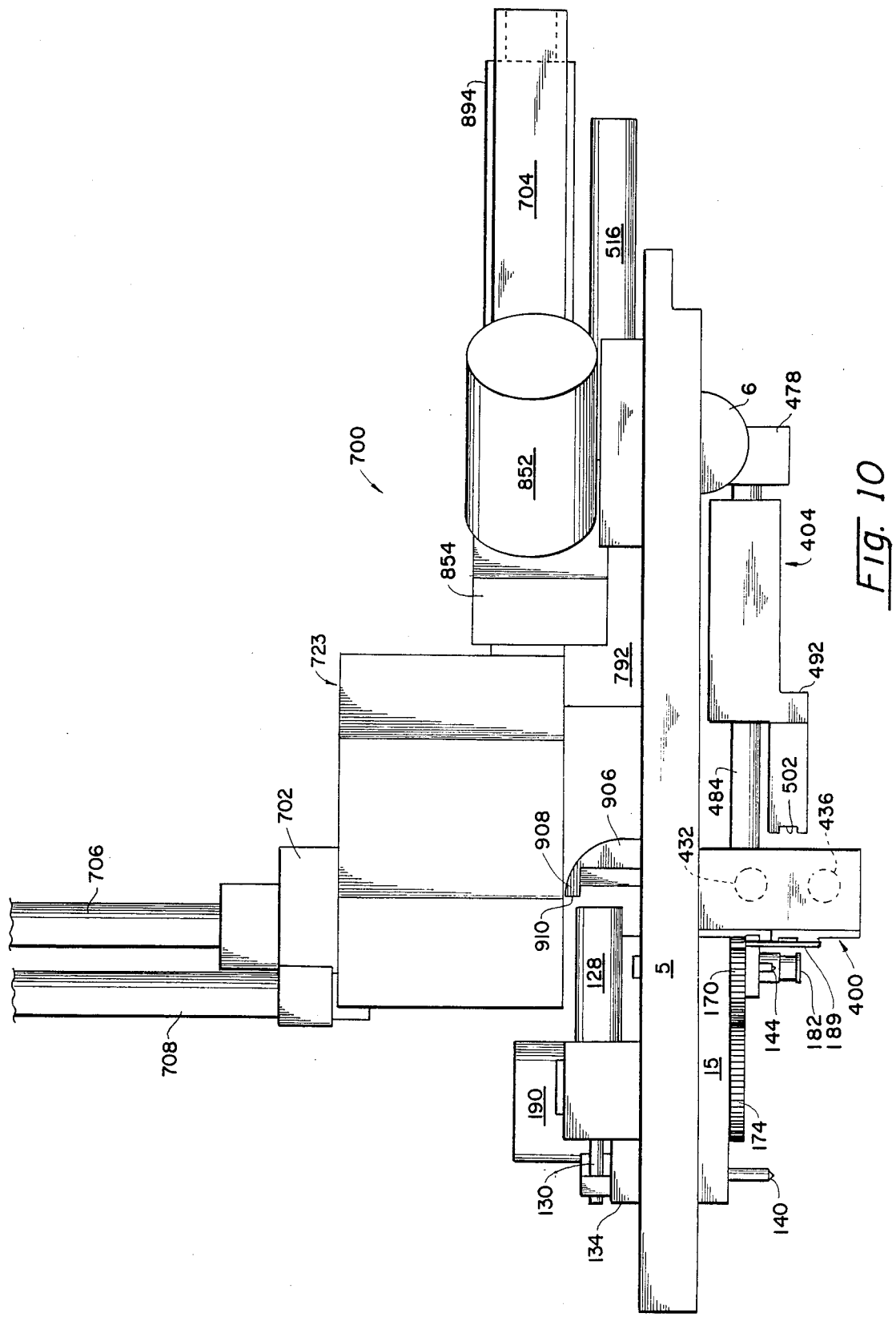
FIG. 10 is a plan view of a portion of the apparatus shown in FIGS. 5 and 9.
Figure 11:
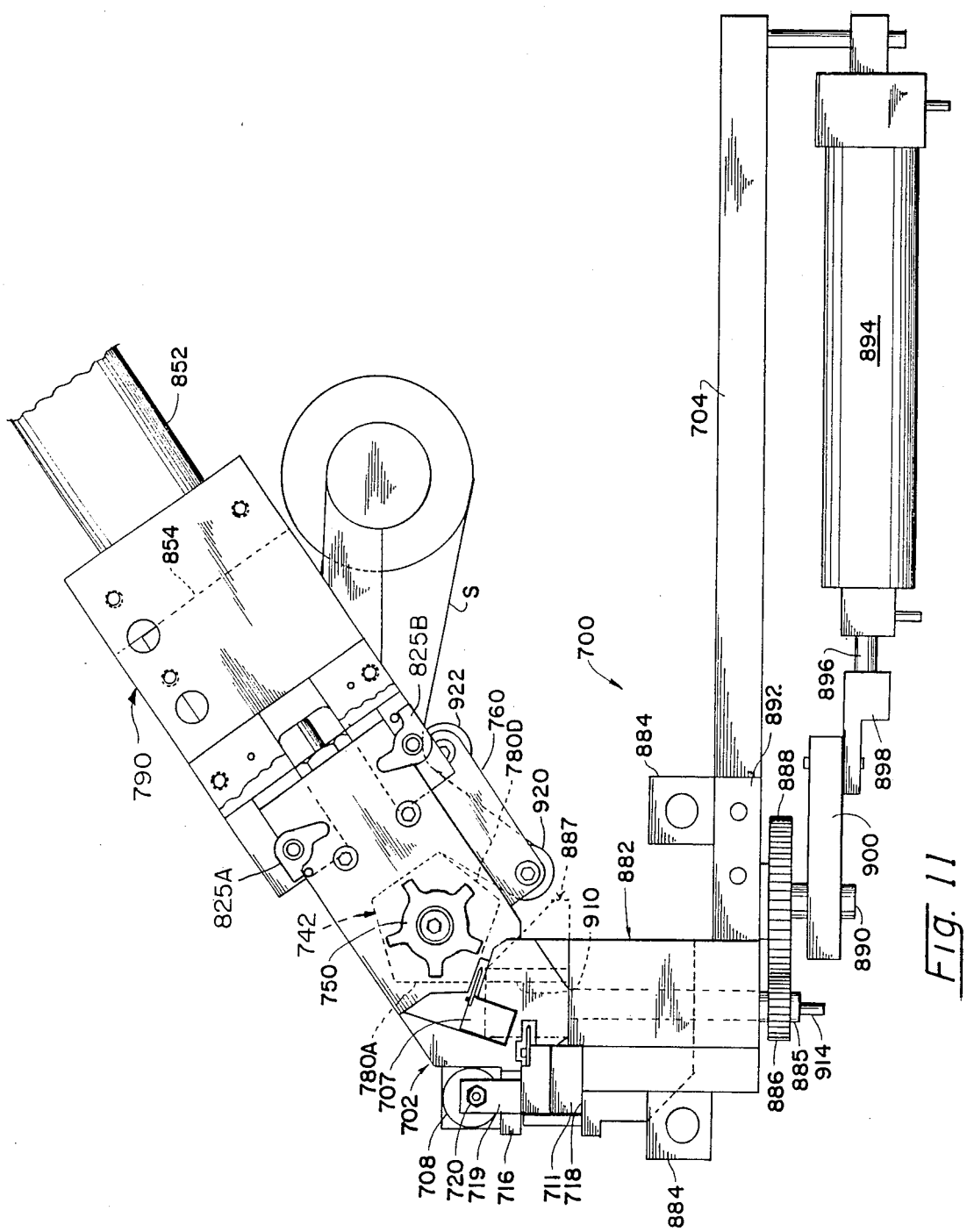
FIG. 11 is a front view of the splicer mechanism.
Figure 12:
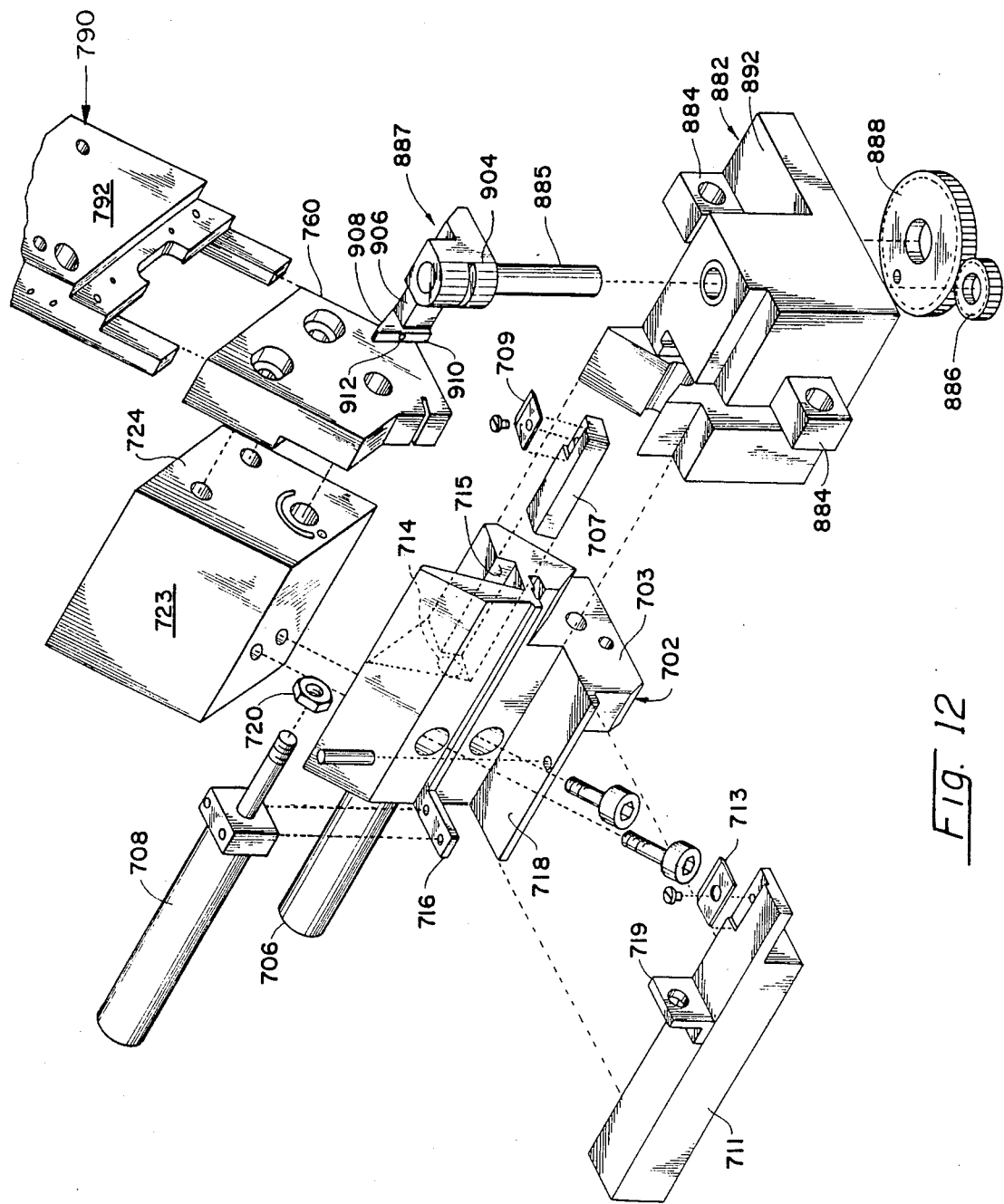
FIG. 12 is an exploded view of a portion of the splicer.
Figure 13:
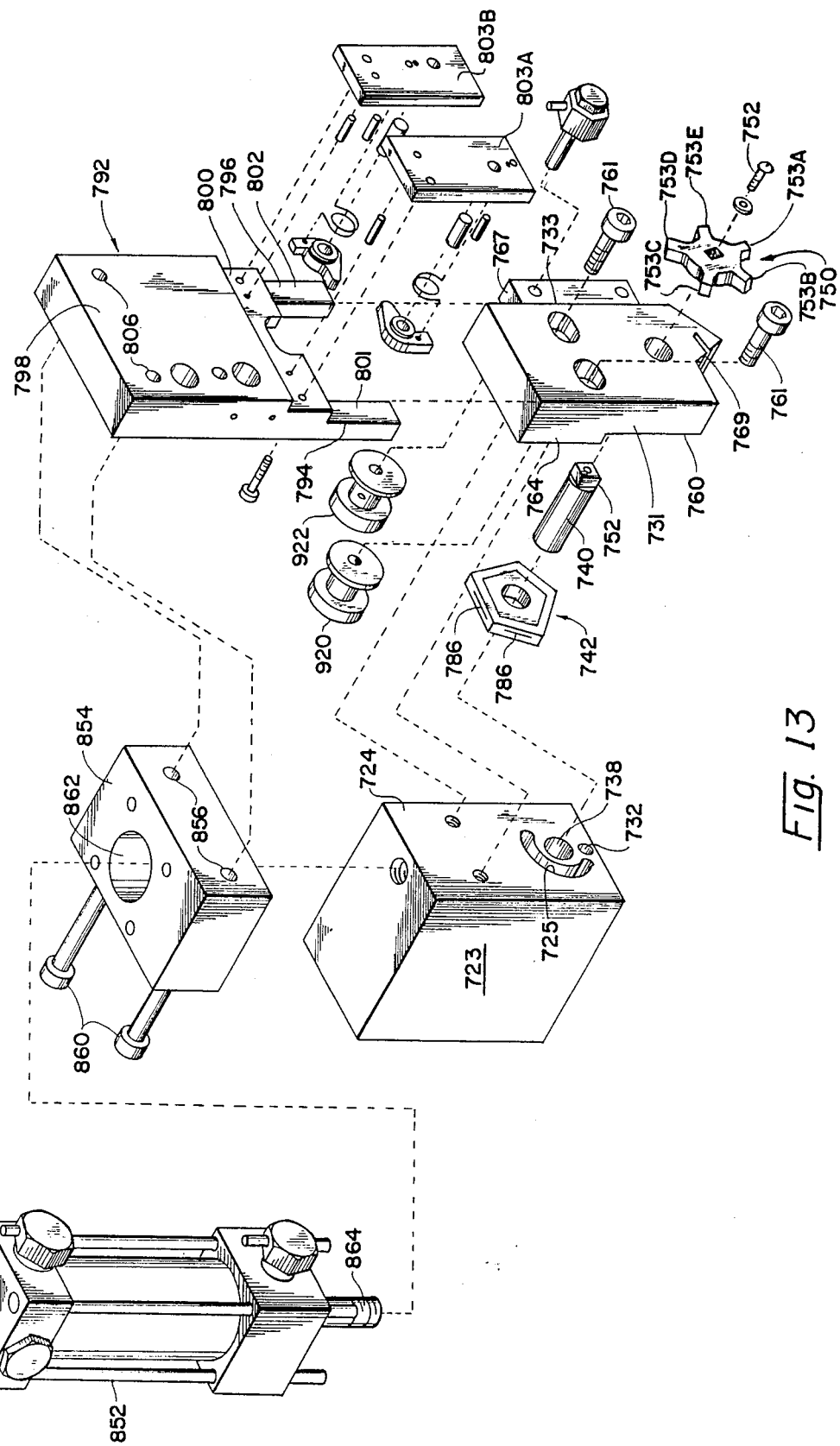
FIG. 13 is an exploded view of another portion of the splicer.
Figure 14:
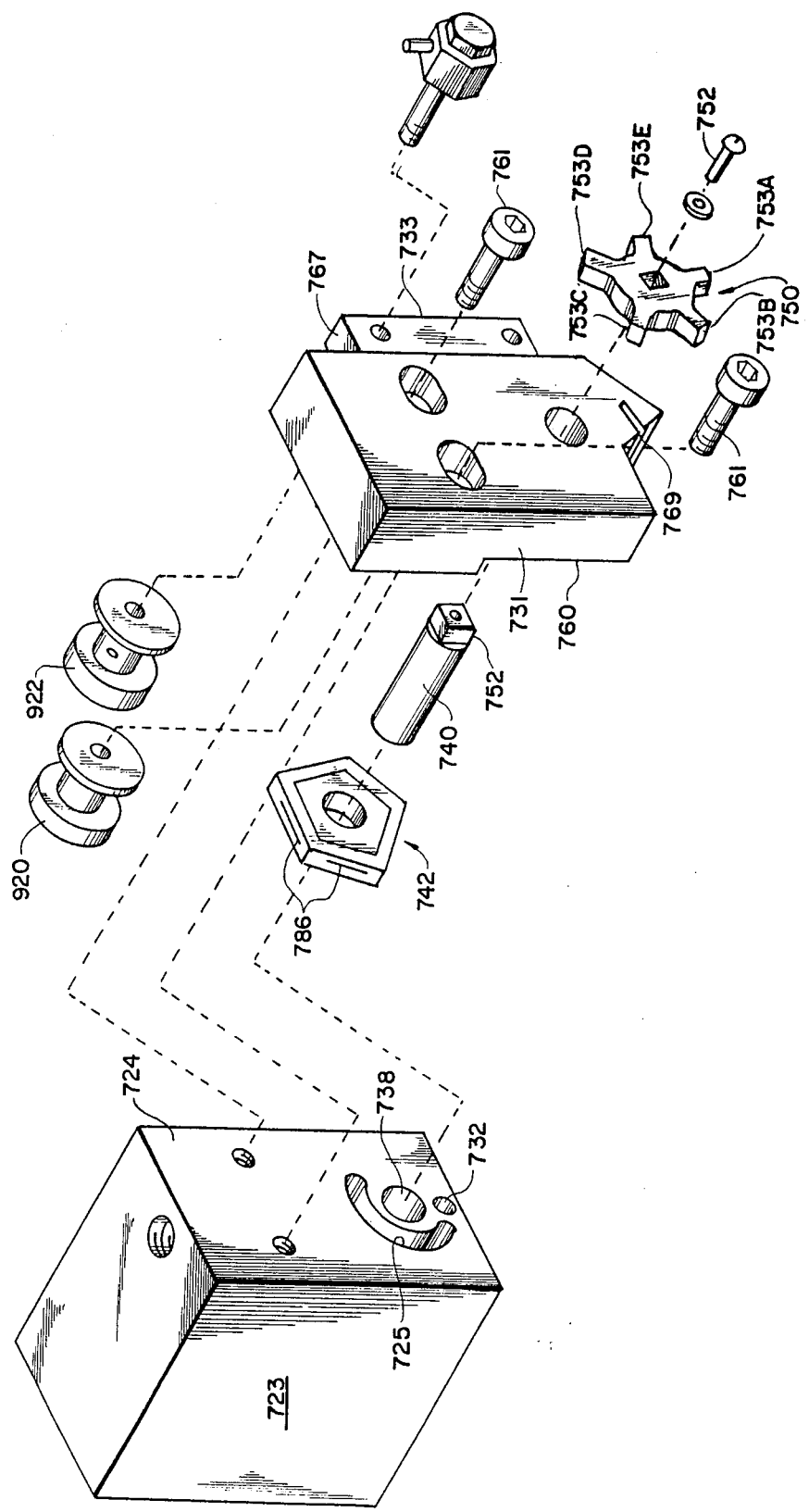
FIG. 14 is an enlargement of a portion of FIG. 13.
Figure 15:
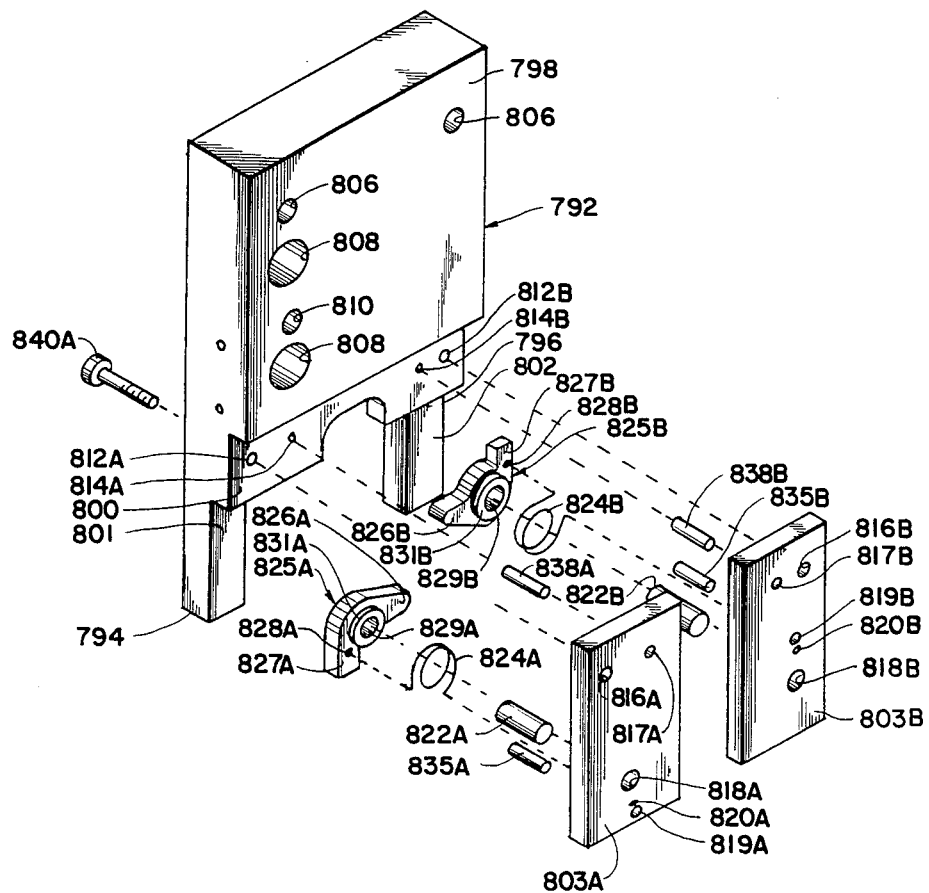
FIG. 15 is an enlargement of another portion of FIG. 13.
Figure 17:
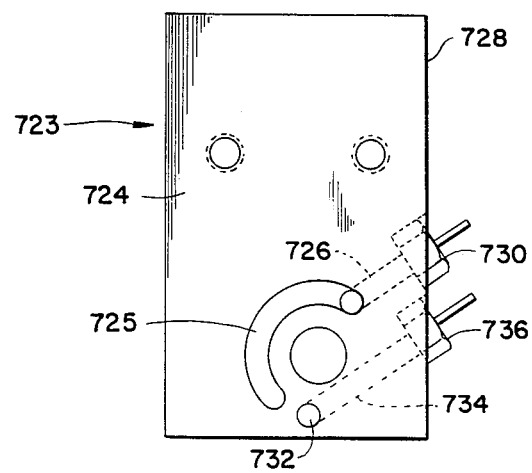
FIG. 17 is an end view of another component of the splicer.
Figure 16:
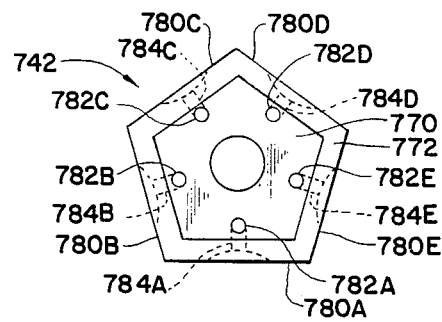
FIG. 16 is an end view of the splicing feed wheel.

Referring now to FIGS. 9-11, the splicer includes a slide plate assembly 790 that is slidably mounted for reciprocal movement relative to block 723. The slide plate assembly comprises a slide plate 792 that is notched at its bottom end to form two legs 794 and 796. The front surface has a stepped configuration which includes an upper portion 798, an intermediate surface portion 800, and a pair of coplanar lower portions 801 and 802. Plate 792 also is provided with a pair of parallel threaded holes 806, a pair of parallel smooth mounting holes 808, a threaded mounting hole 810, a pair of smooth holes 812A and 812B, and a pair of smooth holes 814A and 814B.

Plate 792 supports a pair of pawl assemblies which are held in place by a pair of pawl-retaining plates 803A and 803B. As seen best in FIGS. 11 and 15, the two pawl assemblies are similar but not identical. Looking first at the pawl assembly shown on the left in FIG. 15, the rectangular pawl-retaining plate 803A has a threaded hole 816A and four smooth holes 817A, 818A, 819A and 820A. A coil spring 824A surrounds a dowel 822A and has one end inserted in pawl plate hole 820A. A pawl 825A, having a first arm 826A, a second arm 827A (with a blind hole 828A formed therein) and a pivot hole 829A, is mounted on dowel 822A. Pawl 825A has a raised portion 831A surrounding the pivot hole 829A which acts as a spacer for the pawl relative to plate 803A, and coil spring 824A has its other end inserted in the pawl's blind hole 828A. This arrangement allows pawl 825A to pivot on dowel 822A against the biasing action of spring 824A. A smaller dowel 835A, press-fitted into bore 819A, acts as a stop for the pawl arm 827A, and spring 824A tends to hold the arm 827A against the dowel stop. Thus, pawl 825A can pivot clockwise but not counterclockwise from the position shown in FIG. 15.

The left hand pawl assembly just described is attached to the plate 792 by first press-fitting a dowel 838A into mounting hole 814A, and thereafter pressing the pawl assembly against plate 792 so that the free end of dowel 838A is press-fitted into the pawl plate's hole 817A, with the slide plate's hole 812A being aligned with the pawl-retaining plate's hole 816A. A screw 840A is then passed through the hole 812A of plate 792 and screwed into the pawl plate's threaded hole 816A to secure the pawl assembly to slide plate 792. It is to be appreciated that the various parts of the pawl assembly and slide plate 792 are appropriately sized so that pawl 825A will be free to pivot on dowel 822A in the manner previously described.

The pawl-retaining plate 803B of the right hand pawl assembly has a threaded hole 816B and four smooth holes 817B, 818B, 819B and 820B. A pivot dowel 822B is press-fitted into hole 818B. A coil spring 824B surrounds dowel 822B and has one end inserted into the pawl plate hole 820B. Pawl 825B, having a first arm 826B, a second arm 827B, (with a blind hole 828B formed therein) and a pivot hole 829B, is mounted on pivot dowel 822B. Pawl 825B has a raised portion 831B surrounding pivot hole 829B which acts as a spacer for the pawl relative to plate 803B, and coil spring 824B has its other end inserted in the pawl's blind hole 828B. This arrangement allows pawl 825B to pivot on dowel 822B against the biasing action of spring 824B. A dowel 835B, press-fitted into hole 819B, acts as a stop for pawl arm 827B, and spring 824B tends to hold arm 827B against the stop dowel. Thus, pawl 825B can pivot counterclockwise but not clockwise from the position shown in FIG. 15.

The right hand pawl assembly just described is attached to plate 792 by first press-fitting a dowel 838B into slide plate hole 814B, and thereafter pressing the pawl assembly against the slide plate so that the free end of dowel 838B is press-fitted into the pawl plate's hole 817B, with the slide plate's hole 812B being aligned with the pawl-retaining plate's hole 816B. A screw (not shown but like screw 840A) is then passed through the mounting plate hole 812B and screwed into the threaded hole 816B to secure the pawl assembly to the slide plate. It is to be appreciated that the various parts of the right hand pawl assembly and the slide plate 792 are appropriately sized so that pawl 825B will be free to pivot on dowel 822B in the manner previously described.

Slide plate assembly 790 is disposed so that the legs 794,796 of slide plate 792 straddle but lie close to the opposite flat side surfaces 731,733 of bracket plate 760, thereby preventing plate 792 from moving side to side while permitting the slide plate assembly to reciprocate relative to block 723 along a path parallel to the two legs 794 and 796.

Looking next at FIGS. 9-11 and 13, the splicer also includes a splicer actuator assembly 850 having a double-acting pneumatic actuator 852 which is attached to a mounting block 854. Block 854 has a pair of smooth holes 856 sized to accept a pair of screws 860 that are screwed into the threaded holes 806 of slide plate 792, thereby securing the slide plate to mounting block 854. Block 854 also has an oversized hole 862 for slidably accommodating the piston rod 864 of actuator 852. The outer end of piston rod 864 is screwed into a threaded hole in splicer block 723. Hose lines (not shown) are used to connect opposite ends of the cylinder of actuator 852 to a suitable source of pressurized air via suitable valve means (not shown) so that when air is applied to one end of the cylinder, the piston rod will be extended, and conversely when air is applied to the other end of the cylinder, the piston rod will be retracted. Piston rod 864 is normally extended. When the piston rod is retracted, it causes the slide plate assembly 790 to move downward relative to splicer block 723. Movement of slide plate assembly 790 will cause engagement of arm 826A of pawl 825A with one of the teeth 753A-E of ratchet wheel 750. As a result, the ratchet wheel will be advanced in a counterclockwise direction (as viewed in FIG. 13) so that the applicator wheel is advanced one-half space. Similarly upward movement of the slide plate assembly 790 to its original extended position (FIG. 9) will result in engagement of arm 862B of pawl 825B with another one of the teeth of the ratchet wheel. As a result, the ratchet wheel will be advanced counterclockwise (as viewed in FIG. 13), moving the applicator wheel another one-half face. It is to be noted that pawl 825B will yield on downward motion of slide plate 792 and pawl 825A will yield on upward motion of slide plate 792.

The splicer further includes a splicing tape applicator arm assembly that is carried by bearing block 882. Rotatably mounted in bearing block 882 is a shaft 885 having a gear 886 attached to its lower end and a splicing tape applicator arm 887 attached to its upper end. That gear meshes with another gear 888 that is mounted on a stub shaft 890 that is rotatably mounted at one end in a side extension 892 of bearing block 882. Attached to the underside of bar 704 is a pneumatic actuator 894. The opposite ends of the cylinder of actuator 894 are connected via suitable hose lines (not shown) and solenoid valve means (also not shown) to a source of pressurized air, whereby the actuator may be operated to alternately extend and retract its piston rod 896. That piston rod carries an L-shaped lever 898 having one end pivotally connected to one end of a crank arm 900. The other end of crank 900 is secured to the bottom end of shaft 890. When piston rod 896 is extended, it causes crank arm 900 to rotate shaft 890, whereupon the gears 886 and 888 cooperate to rotate shaft 885, causing arm 887 to rotate from its at-rest position, i.e., the position shown in FIGS. 10-12.

As seen in FIGS. 10 and 11, applicator arm 887 comprises an anchor section 904 attached at one end to shaft 885, a body section 906 offset from the anchor section, and a tape holding and applying section 908 having a flat face 910 that is provided with a hole or slit 912 that connects to an interior chamber (not shown) that extends through body section 906 and anchor section 904 to shaft 880. That shaft is hollow and has a side port (not shown) that connects with the interior passage in the applicator arm. The upper end of shaft 885 is closed off, but its bottom end is fitted with a hose fitting 914, whereby the interior chamber in applicator arm 887 may be connected by a hose line (not shown) to a source of vacuum (not shown) via a solenoid valve means (also not shown).

Referring now to FIG. 11, the coupling between actuator 894 and the applicator arm 887 is such that when piston rod 896 is retracted, the face 910 of applicator arm 887 is aligned vertically with one of the faces of applicator wheel 742 (assuming that the piston rod of actuator 852 is fully extended as shown in FIGS. 9 and 11). When piston rod 896 is extended, arm 887 rotates 180 degrees (counterclockwise as viewed in FIG. 10), moving its flat face 910 from its position adjacent the applicator wheel through an opening in the support plate 15 and against the use and leader tapes that are held by suction to the splicing block assembly. If so moved, the face 910 of splicing tape applicator arm 887 extends vertically across the gap between the upper splicing block and the second or third splicing block, depending upon whether the second or third splicing block is positioned adjacent the upper splicing block.

Use of the splicer requires adhesive splicing tape. A supply roll (not shown) of adhesive splicing tape S is mounted on a roll holder (not shown) attached to the rear side of plate 5 and threaded from the supply roll over a pair of tape guide rolls 920 and 922 to the applicator wheel. Guide rolls 920 and 922 are attached to the side flange 767 of plate 760. For purposes of discussion, assume that the applicator wheel is at-rest with the piston rod 864 of actuator 852 fully extended, the corner formed by applicator wheel faces 780A and 780E is positioned as shown in FIG. 11, and the splicing tape S extends over the faces 780D-A of the applicator wheel and terminates at the corner of faces 780A and 780E. Assume also that suction has been applied via hose fitting 730 to the applicator wheel faces 780C-A to grip the splicing tape thereto. No suction is applied to applicator wheel faces 780E and D since blind hole 782E is not aligned with vacuum port 732 in splicer block 723 and blind hole 782D is not aligned with arcuate groove 725. If now actuator 852 is operated so as to move the slide assembly 790 downward and then upward again, the applicator wheel will rotate and advance the splicing tape a distance equal to the length of one of the faces 780A-E. As this occurs, suction is applied to face 780D and suction is terminated at face 780A.

As suction is released from face 780A, the leading end of the splicing tape will be released from wheel 742 and will drop down in front of the flat face 910 of the applicator arm, where suction applied to the applicator arm will cause the tape to be pulled tight against face 910. Once this has occurred, actuator 706 is operated to move the splicing tape cutter blade 709 forward into the narrow gap between applicator wheel 742 and applicator face 910, thereby severing the splicing tape at that point so that the short length of tape held to face 910 is now separate from the splicing tape held to the applicator wheel. It is to be noted that bracket plate 760 has a slot 769 to accommodate cutter blade 709, thereby permitting the carrier blade to pass beyond the full width of applicator arm face 910 to assure complete severing of the splicing tape.

If subsequently actuator 894 is operated so that applicator arm 887 is swung 180 degrees, the short length of splicing tape on face 910 will be pressed against the tapes held in the tape guide grooves of splicing block 400 and whichever one of the splicing blocks 402 and 404 is adjacent to splicing block 400. At that point suction to applicator arm face 910 is terminated, and the applicator arm is returned to its original at-rest position, leaving the cut piece of splicing tape in joining relation with the tapes on the adjacent splicing blocks. Once applicator arm 887 has returned to its at-rest position, actuator 852 is against operated to reciprocate slide plate assembly 790, thereby again advancing the applicator wheel the length of one of its faces, and suction is controlled among the several applicator wheel faces and the applicator arm face 910 so that the leading end of the splicing tape will be released from the applicator wheel and sucked tight against the face 910 of the applicator arm. Then cutter actuator 706 is again operated to sever the splicing tape between the applicator wheel and the applicator arm. At that point the splicer is again ready to transfer a piece of splicing tape from arm 887 to adjoining tapes held by the splicing block assembly.

MACHINE CONTROL SYSTEM

Figure 20:
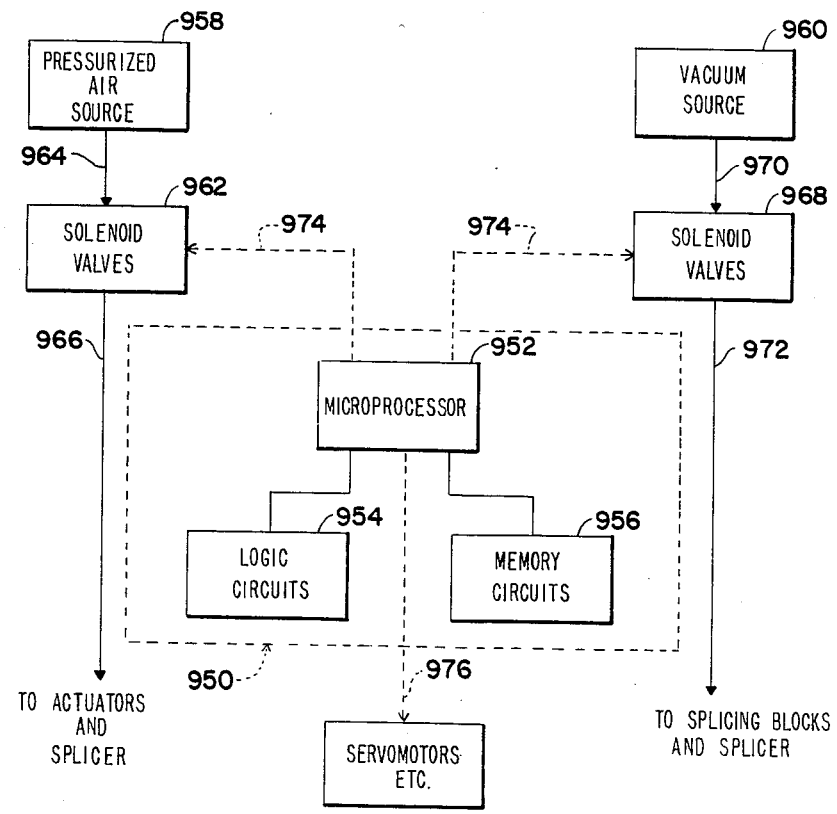
FIG. 20 is a schematic block diagram of the control system for the machine.

FIG. 20 schematically illustrates the control system for the machine. The control system comprises a programmable controller 950 which preferably comprises microprocessor 952 and associated logic and memory circuits 954 and 956. Additionally, the control system comprises a source of pressurized air 958, a vacuum source 960, a first plurality of solenoid valves 962 connected by hose lines 964 and 966 so as to control the flow of pressurized air from source 958 to the various actuators and air bearings hereinabove described, including those of the splicer assembly 700, a second plurality of solenoid valves 968 connected by hose lines 970 and 972 so as to control the application of suction by vacuum source 960 to the hose fittings (hereinabove described) of shift blocks 400, 402 and 404, and also, as required, to splicer applicator arm 887, a plurality of electrical circuit lines 974 for transmitting electrical signals from the programmable controller to the individual solenoid valves, and a plurality of electrical circuit lines 976 for transmitting signals between the programmable controller and the other electrical components of the machine, such as servomotors 125 and 190 and stepping motor 53, the tachometer (not shown) associated with tape counter roll 908, and other electrical components of the tape winding system (not shown).

The microprocessor 952 of programmable controller 950 is programmed so as to cause the machine to operate in the manner hereinafter described. Details of the microprocessor computer program are not provided since (1) programming of a microprocessor is a well-known art, (2) the specific form of the program will vary according to the kind or model of microprocessor used in the programmable controller and the programming language used in preparing the computer program, (3) the nature and form of the program will be obvious to a person skilled in the art from the following detailed description of the operation of the machine, and (4) the timing aspects of the program will vary according to the response characteristics of the various pneumatic and electrical devices employed in the machine.

MACHINE OPERATION

A description of the mode of operation of the machine follows. For ease of description, the following conditions exist: (1) assume that a series of cassettes are positioned on conveyor 13 with their doors on top and their lids facing front panel 3, (2) no cassette is in station 12 or in position on slide plate 15, (3) the splicer is in the position of FIGS. 9 and 11, with splicing tape S being held by suction to faces 780A, B and C of the applicator wheel, (4) a severed piece of splicing tape is held by suction to face 960 of applicator arm 887, (5) magnetic tape T from the supply reel is threaded over and under guide rolls 902, 904 and 906, and tape counter wheel 908, down along the vertical surface 792 of splicing block 404, around guide rolls 514 and along tape guide groove 500 where it is held by suction against flat surface 502, and (6) suction is applied to tape guides 420 and 468 of splicing blocks 400 and 402.

Operation of the above-described machine is as follows: a cassette C is discharged from conveyor 13 onto movable ledge 40, with its door facing up and its lid facing front panel 3. On command from the controller, ledge 40 is retracted momentarily, causing the cassette to drop down in cassette supporting station 12. As the cassette drops down, it rotates so that its door now faces cassette guide 34. Then block 308 is moved toward cassette guide 32, causing its ribs 312 and its projections 314 to release the lid 608 and slide it to open position. Block 308 also forces the cassette against guide 32. As block 308 is returned to its at-rest position, plate 80 on carriage 56 is moved toward the front panel, so as to cause suction cups 90, 92 to engage the front of the cassette. Vacuum is supplied to cups 90, 92 causing them to grip the cassette. Then plate 80 is retracted to pull the cassette out of station 12, and carriage 56 is shifted to the right to place the cassette in front of slide plate 15 and behind carriage 100. At this time, slide plate 15 is in its furthest position from the splicing block assembly.

Next transport plate 80 is moved forward to place cassette C on locator pins 140–146, and simultaneously carriage 100 is also moved forward so as to cause its suction cup 114 to grip the cassette by suction. Then the suction to cups 90 and 92 is terminated to release those cups from the cassette, and transport plate 80 is retracted away from the cassette and moved by carriage 56 back in front of station 12, leaving the carriage 100 to keep the cassette clamped against the locator pins. As the cassette is moved into engagement with the locator pins, its door engages pin 189 and is forced to open position.

As carriage 56 is moving away from the cassette, actuator 516 is operated to move slide plate 15 toward the splicing block assembly, and motors 178 and 180 are energized so as to rotate the two extractor arms and thereby extract the leader and place it in the tape guides of splicing blocks 400 and 402. At this time, suction is being applied to those blocks and the magnetic tape to be loaded is held by suction in the tape guide of splicing block 404. Next, cutter mechanism actuator 708 is operated so as to cause cutter support 711 to reciprocate forward and backward through an opening in slide plate 15, causing cutter blade 713 to reciprocate in the narrow gap between splicing blocks 400 and 402 and thereby sever the leader tape into first and second leader sections held by blocks 400 and 402 respectively.

Then splicing block 402 is lowered and splicing block 404 is moved so as to place its tape guide track into alignment with the tape guide track of splicing block 400.

Next the splicer is operated so as to (1) rotate arm 887 so as to press a previously cut piece of splicing tape onto the adjacent ends of the first leader section held by splicing block 400 and the magnetic tape held in the tape guide groove of splicing block 404, (2) terminate the suction at face 910 of arm 887 so as to release the short length of splicing tape, (3) return arm 887 to its at-rest position (FIG. 10), (4) cause the slide plate assembly 790 to reciprocate to advance additional splicing tape down in front of face 916 of the applicator arm, (5) reapply suction to arm 887 so that the leading end of the splicing tape will be drawn to and held against face 910 by suction, and (6) cause cutter blade 709 to cut the splicing tape as previously described.

Then vacuum to splicing blocks 400 and 404 is terminated and wind motor 190 is turned on to cause spindle 194 to wind magnetic tape into the cassette. During the winding operation, leader extractor arm 160 is held in leader-extracting position by virtue of hole 177 of gear 174 being engaged by the extended piston rod of actuator 179. However, extractor arm 162 was returned to its at-rest position after the leader was cut and before splicing block 402 was lowered to make room for splicing block 404. When a desired amount of tape has been wound, motor 190 is turned off and vacuum is reapplied to splicing blocks 400 and 404. Next cutter blade 713 is again reciprocated so as to cut the magnetic tape held to blocks 400 and 404.

This is followed by retraction of block 404 and return of block 402 to its original position adjacent block 400. Then the splicer is again operated in the manner previously described to splice the trailing end of the magnetic tape on block 400 to the second leader on block 402.

Thereafter, vacuum to blocks 400 and 402 is terminated and extractor arm 160 is returned to its at-rest position (FIG. 5.). Then motor 190 is turned on again briefly to pull the trailing end of the magnetic tape and the second leader fully within the cassette.

Next, pins 196 and 197 are pushed forward to depress the cassette lid lock pins and simultaneously carriage 100 is retracted. This pulls the cassette free of the locater pins and allows the cover and the spring-biased cassette lid to close. Once carriage 100 has been retracted far enough to free the cassette from locator pins 140, 142, 144 and 146, suction to cup 114 is terminated, thereby releasing the cassette and allowing it to fall out of the machine by gravity. Thereafter the machine is ready to load a new C-0 cassette.

A specific advantage of the new and improved shift block assembly is that it may be used in machines for loading various types of C-Zero cassettes, e.g., Philips audio cassettes, video cassettes such as those incorporating the VHS, Beta or 8 mm formats, and RDAT cassettes.

A specific advantage of the new and improved splicer is that it is quick-acting, reliable, provides a section of splicing tape of precisely determined length, and applies the cut splicing tape so as to repetitively yield a strong satisfactory splice joint. Another advantage is that it may be used in other cassette loading machines that handle other types of tapes, e.g., strips of motion picture or other photographic film.

A specific advantage of the machine herein described and illustrated is that it is a compact, fast and reliable apparatus, and also that it can be modified to handle different kinds of cassettes, including other types of tapes, e.g., motion picture film.

The foregoing description of the invention and the mode of operation of a machine incorporating the invention will be readily understood by persons skilled in the art. Equally obvious to persons skilled in the art will be that various modifications that can be made to the machine, including changes to the novel splicing block assembly and the novel splicing tape dispenser applicator, and associated mechanisms, without departing from the principles of the invention, e.g., solenoids may be substituted for pneumatic actuators.

What is claimed is:

1. A splicing block assembly comprising:
    a first splicing block having a first tape guide means located in a selected plane;
    a second splicing block having a second tape guide means located in said selected plane in alignment with said first tape guide means;
    means mounting said second block for reciprocal movement along a selected axis extending parallel to said first and second tape guide means between a first position along said selected axis in which said second block is adjacent to said first block and a second position along said selected axis in which said second block is spaced from said first block;
    a third splicing block having a third tape guide means that extends parallel to said selected axis; and
    means mounting said third splicing block for reciprocal movement between (b 1) a first position in which said third splicing block is spaced from said first and second splicing blocks and (2) a second position in which said third splicing block is located between said first and second splicing blocks and said third tape guide means is located in said selected plane in alignment with at least one of said first and second tape guide means, said third splicing block being in its said second position when said second splicing block is in its said second position.

2. A splicing block assembly according to claim 1 wherein said third splicing block is mounted for reciprocal movement along a second axis that is perpendicular to said selected axis.

3. A splicing block assembly according to claim 1 further including means for securing said first splicing block against movement.

4. A splicing block assembly according to claim 1 wherein said second splicing block is mounted for reciprocal sliding movement along at least one rod that extends parallel to said first and second tape guide means.

5. A splicing block assembly according to claim 1 further including means for reciprocating said second splicing block along said selected axis.

6. A splicing block assembly according to claim 1 wherein said third splicing block is mounted for reciprocal sliding movement along a rod that extends at a right angle to said first and second tape guide means.

7. A splicing block assembly according to claim 1 further including means for reciprocating said third splicing block from one to the other of said first and second positions.

8. A splicing block assembly according to claim 1 wherein said second splicing block is mounted for reciprocal sliding movement along a first rod that extends parallel to said first and second tape guide means, and said third splicing block is mounted for reciprocal sliding movement along a second rod that extends at a right angle to said first and second tape guide means, and further including means for reciprocating said second splicing block along said first rod, and means for reciprocating said third splicing block along said second rod from one to the other of said first and second positions.

9. A splicing block assembly according to claim 8 wherein said first rod is anchored at one end in a mounting block and at its opposite end in said first splicing block.

10. A splicing block assembly according to claim 8 wherein said second rod is anchored at one end in a mounting block and at its opposite end in said first splicing block.

11. A splicing block assembly according to claim 8 wherein said first rod is anchored at one end in a first mounting block and at its opposite end in said first splicing block, and said second rod is anchored at one end in a second mounting block and at its opposite end in said first splicing block.

12. A splicing block assembly according to claim 11 wherein said first splicing block and said first mounting block limit movement of said second splicing block.

13. A splicing block assembly according to claim 11 wherein said first splicing block and said second mounting block limit movement of said third splicing block.

14. A splicing block assembly according to claim 1 wherein said first, second and third tape guide means comprise grooves in said first, second and third splicing blocks respectively, with each groove having a bottom surface, and further wherein each splicing block has an interior chamber, at least one opening in the bottom surface of its said groove leading to its said chamber, and a port for said chamber having means for connecting said port to a source of vacuum, whereby suction maybe applied through said port, said chamber and said at least one opening to hold a tape in said groove.

15. A splicing block assembly according to claim 1 in combination with splicer means for (1) applying a splicing tape to tapes held by said first and second tape guide means when said second splicing block is adjacent said first splicing block and (2) applying a splicing tape to tapes held by said first and third tape guide means when said third splicing block is interposed between said first and second splicing blocks.

16. A splicing block assembly according to claim 1 further including a panel having front and rear sides, and further wherein said first splicing block is affixed to said panel at said front side and said second and third splicing blocks are disposed on the front side of said panel by their said mounting means.

17. A splicing block assembly according to claim 16 in combination with splicer means for applying a splicing tape to tapes held by said first and second tape guide means when said second splicing block is adjacent said first splicing block and for applying a splicing tape to tapes held by said first and third guide means when said third splicing block is inter between said first and second splicing blocks.

18. A splicing block assembly according to claim 17 wherein said splicer means is mounted on the rear side of said panel, and further wherein said panel has an opening adjacent said first and second splicing blocks, and said splicer means has an arm movable said opening for applying a piece of adhesive splicing tape to tapes held by the tape guide means of said first and second splicing blocks or said first and third splicing blocks.

19. A splicing block assembly to claim 1 further including a mounting panel to which said first splicing block is affixed, first and second mounting members attached to said panel, a first rod attached at one end to said first splicing block and at the other end to said first mounting member, a second rod attached at one end to said first splicing block and at the other end to said second mounting member, and further wherein (a) said second splicing block is mounted for reciprocal sliding movement along said first rod and (b) said third splicing block is mounted for reciprocal sliding movement along said second rod, and further including means for reciprocating said second splicing block along said first rod and means for reciprocating said third splicing block along said second rod from one to the other of said first and second positions.

20. A splicing block assembly according to claim 19 wherein first splicing block and said first mounting member limit movement of said second splicing block.

21. A splicing block assembly according to claim 19 wherein said first splicing block and said second mounting member limit movement of said third splicing block.

22. A splicing block assembly according to claim 19 further wherein said panel has front and rear sides, and said first, second and third splicing blocks are disposed on the front side of said panel.

23. A splicing block assembly according to claim 22 further including splicer means for applying a splicing tape to tapes held by said first and second tape guide means when said second splicing block is adjacent said first splicing block and for applying a splicing tape to tapes held by said first and third tape guide means when said third splicing block is interposed between said first and second splicing blocks.

24. A splicing block assembly according to claim 23 wherein said splicer means is mounted on the rear side of said panel.

25. A splicing block assembly according to claim 23 in combination with tape cutter means for cutting a tape that extends (a) between the tape guide means of said first and second splicing blocks or (b) between the tape guide means of said first and third splicing blocks.

26. A splicing block assembly according to claim 23 wherein said cutter means is disposed on the rear side of said panel.

27. A splicing block assembly according to claim 19 wherein said third splicing block has a first block-mounting section with a passageway to accommodate said second slide rod and a second tape-supporting section comprising said third tape guide means, said second tape supporting section and said first block-mounting section being offset from one another so that said second tape-supporting section may be positioned between said first and second splicing blocks when said first and second splicing blocks are spaced from one another.

28. A splicing block assembly according to claim 1 wherein said first splicing block is fixed to a support member, said second splicing block is slidably mounted on at least one slide rod mounted in spaced relation to said support member, and said third splicing block is slidably mounted on at least one other slide rod mounted in spaced relation to said support member.

29. A splicing block assembly according to claim 1 wherein said third splicing block is L-shaped and comprises a first portion supported in movable relation to said support member, and a second portion extending at a right angle to said first portion and includes the said tape guide means of said third splicing block.

30. A splicing block assembly according to claim 29 wherein said first splicing block is fixed to a planar support member, and further including means movably supporting said first portion of said third splicing block for movement parallel to said planar support member.

31. A splicing block assembly according to claim 29 wherein said third splicing block is supported so that (a) said second portion thereof extends between said first and second splicing blocks when said third splicing block is in its said second position and said second splicing block is in its said second position, and (b) said second portion is removed from between said first and second splicing blocks when said third splicing block is in its said first position.

32. A splicing block assembly according to claim 30 further including first drive means for reciprocating said second splicing block and second drive means for reciprocating said third splicing block.

33. A splicing block assembly according to claim 32 wherein all of said splicing blocks are mounted on a first side of said planar support member, and said first and second drive means are mounted on a second opposite side of said planar support member.

34. A splicing block assembly according to claim 33 wherein said planar support member has first and second apertures, and further including first connecting means extending through said first aperture and connecting said first drive means to said second splicing block, and second connecting means extending through said second aperture and connecting said second drive means to said third splicing block.

35. A splicing block assembly according to claim 31 wherein said tape guide means of said first, second and third splicing blocks all extend vertically, said second splicing block is mounted for reciprocal movement along a vertical axis, and said third splicing block is mounted for reciprocal movement along a horizontal axis.

* * * * *

UNITED STATES PATENT AND TRADEMARK OFFICE
CERTIFICATE OF CORRECTION

PATENT NO. : 4,974,785

DATED : December 4, 1990

INVENTOR(S) : George M. Woodley et al

It is certified that error appears in the above-identified patent and that said Letters Patent is hereby corrected as shown below:

Claim 1, column 22, line 49, "(bl)" should be -- 1 --;

Claim 17, column 24, line 9, "inter" should be -- interposed --;

Claim 18, column 24, line 15, "through" should be inserted after -- movable --; and Claim 20, column 24, line 36, "said" should be inserted after -- wherein --.

Signed and Sealed this

Twenty-first Day of April, 1992

Attest:

HARRY F. MANBECK, JR.

Attesting Officer     Commissioner of Patents and Trademarks